(12) United States Patent
Miller et al.

(10) Patent No.: US 12,521,815 B2
(45) Date of Patent: Jan. 13, 2026

(54) APPARATUS AND METHOD FOR FRICTION WELDING APPURTENANCES TO STORAGE TANKS

(71) Applicant: Forge Tech, Inc., Kemah, TX (US)

(72) Inventors: Michael Lee Miller, Kemah, TX (US);
Daniel J. Rybiki, Kemah, TX (US);
Mathew A. Rybicki, Kemah, TX (US);
Andre S. Todd, Kemah, TX (US)

(73) Assignee: Forge Tech, Inc., Kemah, TX (US)

( * ) Notice: Subject to any disclaimer, the term of this patent is extended or adjusted under 35 U.S.C. 154(b) by 15 days.

(21) Appl. No.: 18/160,458

(22) Filed: Jan. 27, 2023

(65) Prior Publication Data

US 2024/0253151 A1     Aug. 1, 2024

(51) Int. Cl.
*B23K 20/12* (2006.01)
*B23K 20/10* (2006.01)
*B23K 101/12* (2006.01)

(52) U.S. Cl.
CPC .......... *B23K 20/1295* (2013.01); *B23K 20/10* (2013.01); *B23K 2101/12* (2018.08)

(58) Field of Classification Search
None
See application file for complete search history.

(56) References Cited

U.S. PATENT DOCUMENTS

| | | | |
|---|---|---|---|
| 9,174,313 B2 * | 11/2015 | Miller | B65D 88/42 |
| 9,199,333 B2 * | 12/2015 | Miller | B23K 20/1295 |
| 10,124,448 B2 * | 11/2018 | Miller | B65D 90/08 |
| 2020/0378512 A1 * | 12/2020 | Miller | B23P 6/00 |
| 2022/0143741 A1 * | 5/2022 | Fix, Jr. | B23K 20/1295 |

FOREIGN PATENT DOCUMENTS

CA     2862198 A1 *  7/2013 ............. B23K 20/12

* cited by examiner

*Primary Examiner* — Devang R Patel
(74) *Attorney, Agent, or Firm* — Michael G Smith, Esq.

(57) ABSTRACT

Some implementations of ignition-free welding include attaching fasteners to a tank, the tank having a wall, the wall having two parallel surfaces, the fasteners penetrating only one of the parallel surfaces, wherein the tank resides within a vicinity of a hazardous material, includes securing an appurtenance to the tank using the fasteners; and does not include removing the hazardous material.

20 Claims, 44 Drawing Sheets

FRICTION STUD WELDED FIRE-SUPPRESSION COOLING-RING APPARATUS 400

FRICTION STUD WELDED FIRE-SUPPRESSION PIPING APPARATUS 500

FRICTION STUD WELDED FIRE-SUPPRESSION WIND GIRDER APPARATUS 700

FRICTION STUD WELDED PASSIVE ROOF VENT AND OVERFLOW VENT APPARATUS 800

FRICTION STUD WELDED WALKWAY APPARATUS 900

FRICTION STUD WELDED WALKWAY APPARATUS 1000

FRICTION STUD WELDED STAIR TREAD SUPPORT BRACKET 1700

FRICTION STUD WELDED FLOOR PLATE APPARATUS 1900

FRICTION STUD WELDED NOZZLE ENCLOSURE 2600

FRICTION STUD WELDED ANODE/CATHODE ATTACHMENTS 2800

FRICTION STUD WELDED ELECTRICAL ATTACHMENT 3100

FRICTION STUD WELDED SCAFFOLD CABLE SUPPORT 3200

FRICTION STUD WELDED SCAFFOLD CABLE SUPPORT 3300

FRICTION STUD WELDED STAIR INSTALLATION APPARATUS 3600

FRICTION WELDING APPARATUS THAT USES INERT GAS 3900

PNEUMATIC MOTOR PROPULSION SOURCE 4000

METHOD OF A TANK REPAIR PROCESS 4400

APPARATUS AND METHOD FOR FRICTION WELDING APPURTENANCES TO STORAGE TANKS

BACKGROUND OF THE INVENTION

Appurtenances are conventionally attached to metal storage tanks using conventional welding techniques. Conventional welding techniques can include an ignition source, which may ignite combustible materials. An ignition source is particularly dangerous when repairing defects in petroleum product storage tanks. Conventional techniques include arc welding, brazing, adhesives, drill and tap, mechanical fasteners, clamps and polymer appurtenances. In general, appurtenances are an apparatus that is attached to another, more important apparatus; an accessory.

Applications for friction welding of storage tanks include storage tank rooftops, walls and bottoms (floors). Various attachments can be installed to improve existing integrity of storage tank including over-lays and stiffeners Friction welding of storage tanks can performed to repair, improve structural integrity, alter/modify and reconstruct the storage tanks and appurtenances. Friction stud welding may provide retrofit and repair solutions that are compliant with various industry standards such as API 650 and 653, ASME Section VIII and IX, and many others.

SUMMARY OF THE INVENTION

An apparatus within a vicinity of a hazardous material that includes fasteners attached to a tank, the tank having a wall, the wall having two parallel surfaces, the fasteners penetrating within the vicinity of the hazardous material only one of the parallel surfaces and an appurtenance secured to the tank using the fasteners.

DETAILED DESCRIPTION OF THE INVENTION

The detailed description below describes methods and apparatus for repairing and improving structural integrity of storage tanks.

In this disclosure, friction welding, friction bonding, solid-state welding, friction forging, friction forge bonding, friction forge welding, continuous drive friction welding, inertia welding, inertia bonding, solid phase friction welding, ultrasonic welding, ultrasonic bonding, cold bonding, diffusion welding and rotational friction welding are all used synonymously and may include rotating a stud until the two contacting surfaces reach a predetermined temperature, number of rotations, stud length reduction (displacement), time or combination. Fasteners include friction welded studs and may include a nut, washer and c-clip or cotter pin, or some other device to allow a stud to perform as a fastener to fasten apparatus and appurtenances to tanks or other structures. In this disclosure, the guardrail and handrail may be used synonymously, though in practice, there are differences. In this disclosure, a friction stud welded bracket is a bracket that is bolted to a tank or structure using friction welded studs and nuts or fasteners.

In general, appurtenances are installed on metal structures such as the storage tanks, however structures may be made of other materials that can be welded. Appurtenances include but are not limited to metal catwalks, metal stairs, metal decks, metal roofs, brackets (roof brackets and shell brackets), handrails, guardrails, stairs, ladders, foam dispensers, piping (fire suppression piping, piping for transport of product and pipe racks), wind girders, foam dams, roof or shell nozzles, roof vents, bleeders, roof legs, lightning protection, cathodic protection, cooling rings (fire suppression), anything with mounting flanges, fall-protection anchors, scaffold anchor support, catwalks, stairs, platforms, decks, roofs, sensors (with mounting flanges), access ports (manways), anchor chairs, and insulation hangers.

FIG. 1-36 and other portions of this disclosure show that dissimilar metals can be bonded, final strength is greater than either of the two metals used, bonding can be performed in hazardous environments (i.e. explosive, flammable, combustible environments) and portability for ease of use at worksites.

Figure 1:
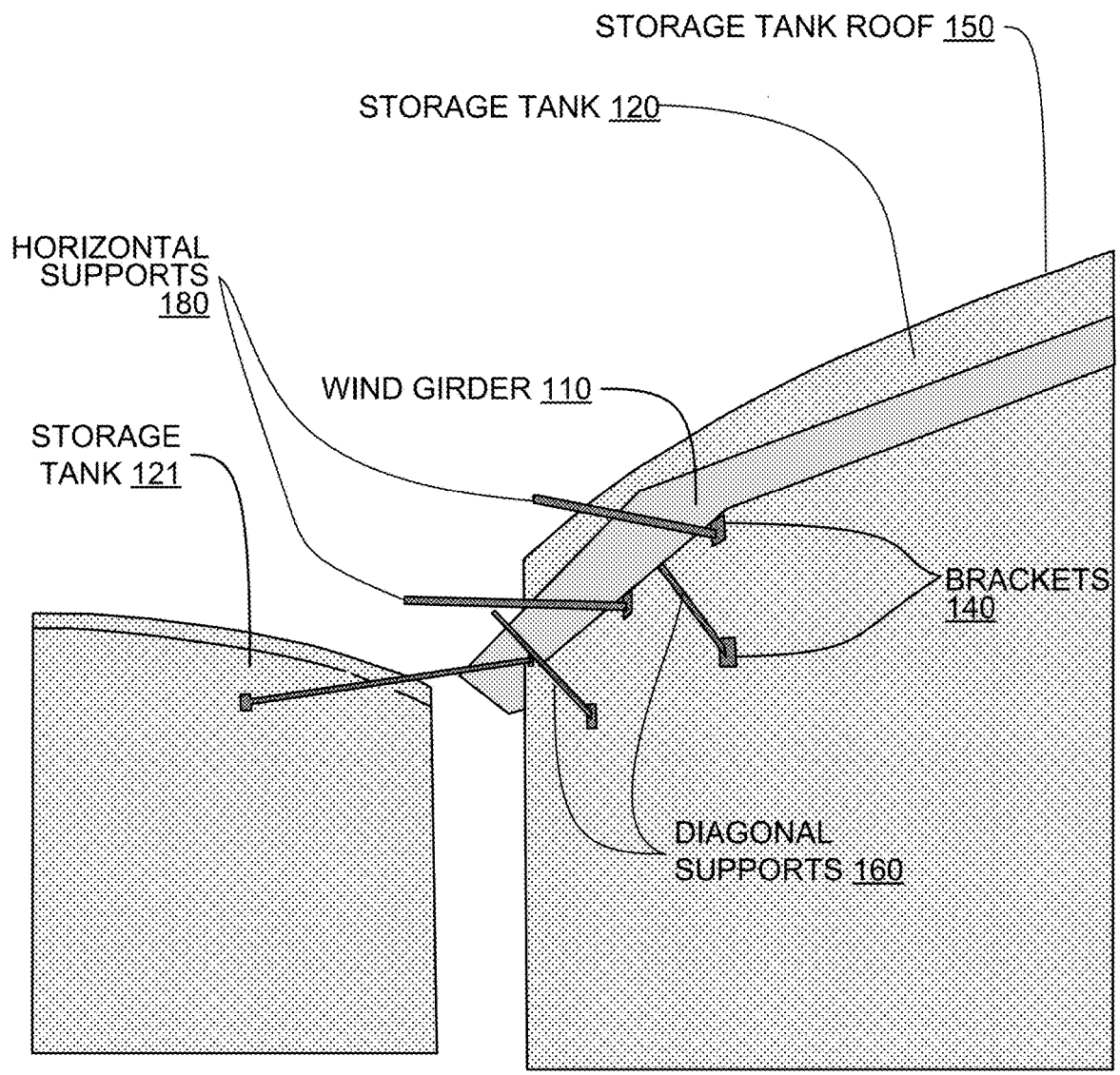
FIG. 1 is an isometric top-side view of a tank having a wind girder apparatus attached using friction stud welding.

FIG. 1 is an isometric view of a friction stud welded wind girder apparatus 100. The friction stud welded wind girder apparatus 100 includes a wind girder 110 that is attached to storage tank 120 and a storage tank 125 via friction stud welding. The wind girder 110 is attached to the storage tank 120 via diagonal supports 160 and friction stud welded brackets 140 that are friction stud welded to storage tanks 120 and 121 using friction welded studs (not shown). Examples of the friction stud welded bracket 140 that are operable in the friction stud welded wind girder apparatus 100 are the friction stud welded brackets in FIG. 12-13.

The storage tank 120 is used to store every known hydrocarbon or chemical liquid, powder or gas. The storage tank 120 each include a storage tank roof 150, which is the top of the storage tank 120. In some implementations, the storage tank roof 150 is made of steel and floats above the contents of the storage tank 120. In some implementations, storage tank roof 150 is a fixed roof welded to the shell of storage tank 120. In some implementations, storage tank 120 will not have a roof and be open to the environment. In some implementations, the storage tank roof 150 is 3/16 inches of hot rolled steel. Storage tank 120 made of steel are exposed to weather, ocean salt and caustic or acidic chemicals which causes corrosion over time. Settlement of storage tank 120 can also cause anomalies to form in storage tank 120.

Storage tank 120 is manufactured in many different sizes but in the implementation shown in FIG. 1, the storage tank 120 is approximately 150 feet in diameter.

Figure 2:
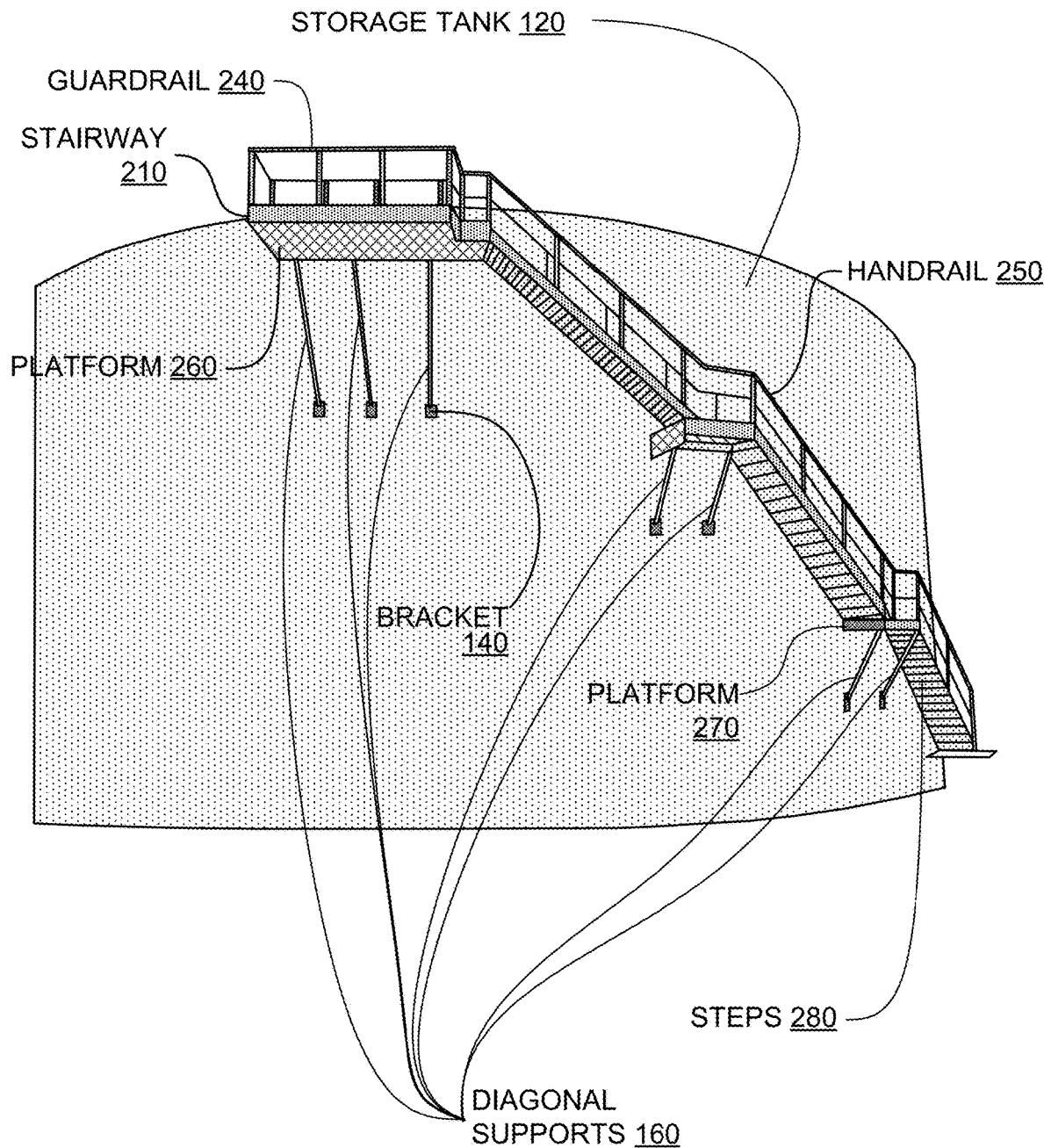
FIG. 2 is an isometric view of a friction stud welded stairway apparatus, according to an implementation.

FIG. 2 is an isometric view of a friction stud welded stairway apparatus 200, according to an implementation. The friction stud welded stairway apparatus 200 includes a stairway 210 that is attached to a storage tank 120 via friction stud welding. The stairway 210 is attached to the storage tank 120 via a diagonal support 160 that is attached to a friction stud welded bracket 140 that is friction stud welded to the shell of storage tank 120 (friction welded studs not shown). In some implementations, diagonal support 160 may be attached to friction stud welded bracket 140 by bolting, welding or riveting to create a support bracket. Examples of the friction stud welded bracket 140 that are operable in the friction stud welded stairway apparatus 200 are the friction stud welded brackets in FIG. 12-13. The friction stud welded stairway apparatus 200 includes a guardrail 240, handrails 250, platforms 260 and 270 and steps 280 that are part of stairway 210.

Figure 3:
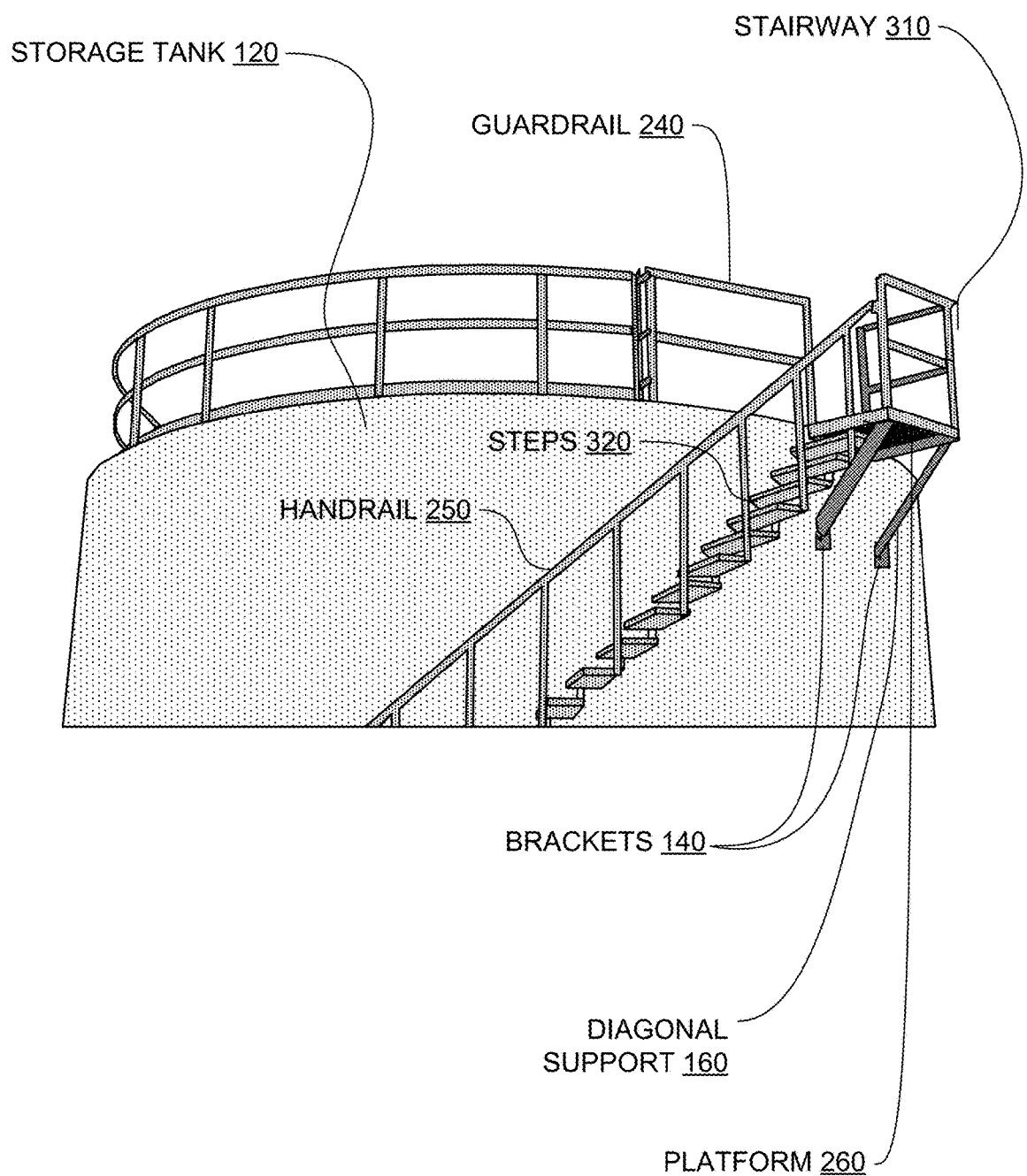
FIG. 3 is an isometric view of a friction stud welded stairway apparatus, according to an implementation.

FIG. 3 is an isometric view of a friction stud welded stairway apparatus 300, according to an implementation. The friction stud welded stairway apparatus 300 includes a stairway 310 that is attached to a storage tank 120 via friction stud welding. The stairway 310 is attached to the storage tank 120 via support brackets 330 that are friction stud welded to storage tank 120. Support bracket 330 is comprised of diagonal support 160 and friction stud welded bracket 140 that is attached to storage tank 120 via a friction stud welded fastener (not shown). Examples of the friction stud welded bracket 140 that are operable in the friction stud welded stairway apparatus 300 are the friction stud welded brackets in FIG. 12-13. The friction stud welded stairway apparatus 300 includes a guardrail 240, handrail 250, a platform 260 and steps 320 that are part of stairway 310.

Figure 4:
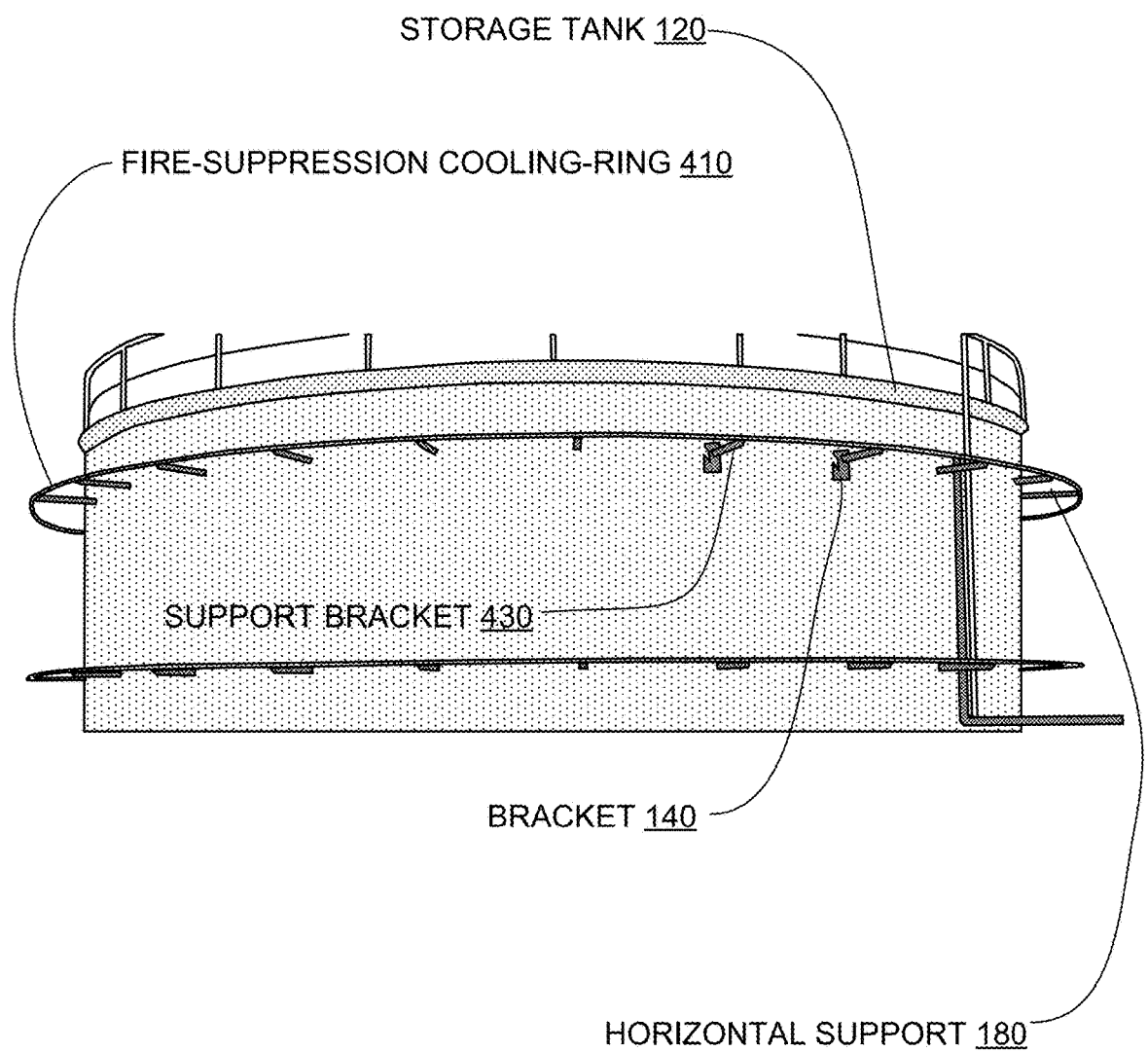
FIG. 4 is an isometric view of a friction stud welded fire-suppression cooling-ring apparatus, according to an implementation.

FIG. 4 is an isometric view of a friction stud welded fire-suppression cooling-ring apparatus 400, according to an implementation. The friction stud welded fire-suppression cooling-ring apparatus 400 includes a fire-suppression cooling-ring 410 that is attached to a storage tank 120 via friction stud welding. The fire-suppression cooling-ring 410 is attached to the storage tank 120 via a support bracket 430 that is comprised of horizontal support 180 and friction stud welded bracket 140 that is friction stud welded to storage tank 120 via a fastener (not shown). Examples of the friction stud welded bracket 140 that are operable in the friction stud welded fire-suppression cooling-ring apparatus 400 are the friction stud welded brackets in FIG. 12-13.

Figure 5:
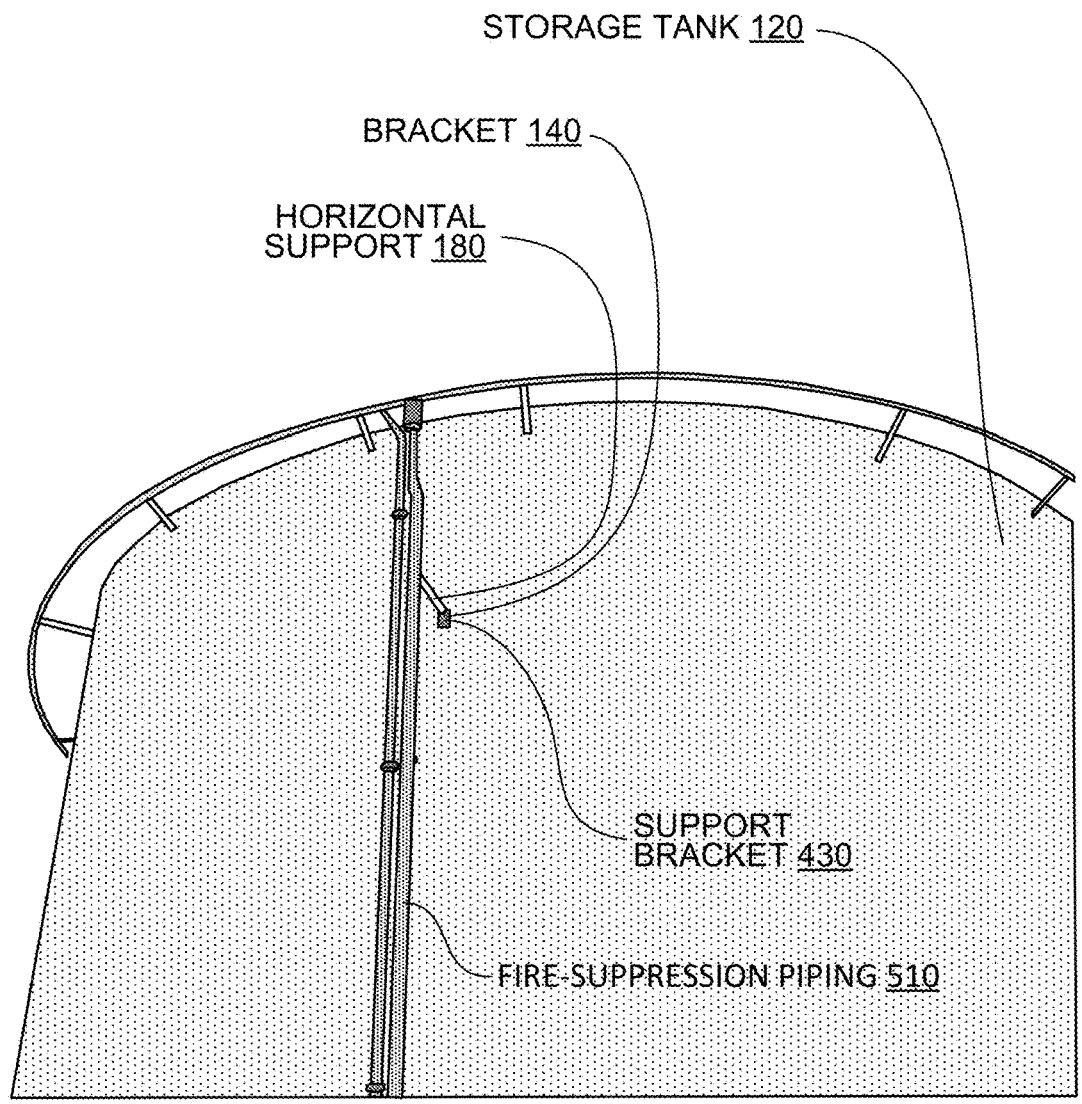
FIG. 5 is an isometric view of a friction stud welded fire-suppression piping apparatus, according to an implementation.

FIG. 5 is an isometric view of a friction stud welded fire-suppression piping apparatus 500, according to an implementation. The friction stud welded fire-suppression piping apparatus 500 includes a fire-suppression piping 510 that is attached to a storage tank 120 via friction stud welding. The fire-suppression piping 510 is attached to the storage tank 120 via a friction stud welded bracket 140 that is friction stud welded to storage tank 120 via a fastener (not shown) and horizontal support 180 which together comprise support bracket 430. Examples of the friction stud welded bracket 140 that are operable in the friction stud welded fire-suppression piping apparatus 500 are the friction stud welded brackets in FIG. 12-13.

Figure 6:
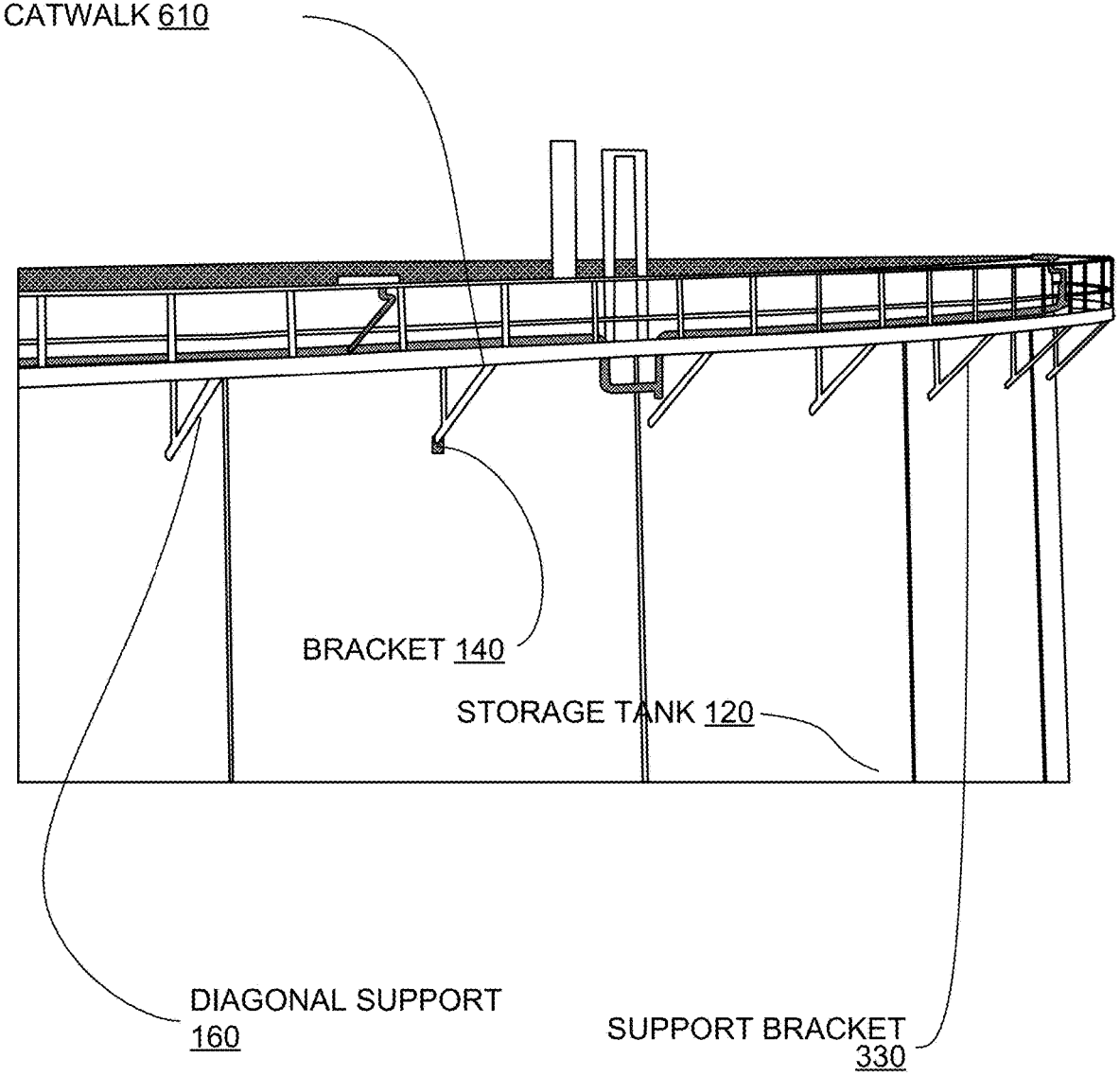
FIG. 6 is an isometric view of a friction stud welded catwalk apparatus, according to an implementation.

FIG. 6 is an isometric view of a friction stud welded catwalk apparatus 600, according to an implementation. The friction stud welded catwalk apparatus 600 includes a catwalk 610 that is attached to a storage tank 120 via friction stud welding. The catwalk 610 is attached to the storage tank 120 via support bracket 330 which is comprised of a diagonal support 160 and a friction stud welded bracket 140 that is friction stud welded to storage tank 120 via a fastener (not shown). Examples of the friction stud welded bracket 140 that are operable in the friction stud welded catwalk apparatus 600 are the friction stud welded brackets in FIG. 12-13.

Figure 7:
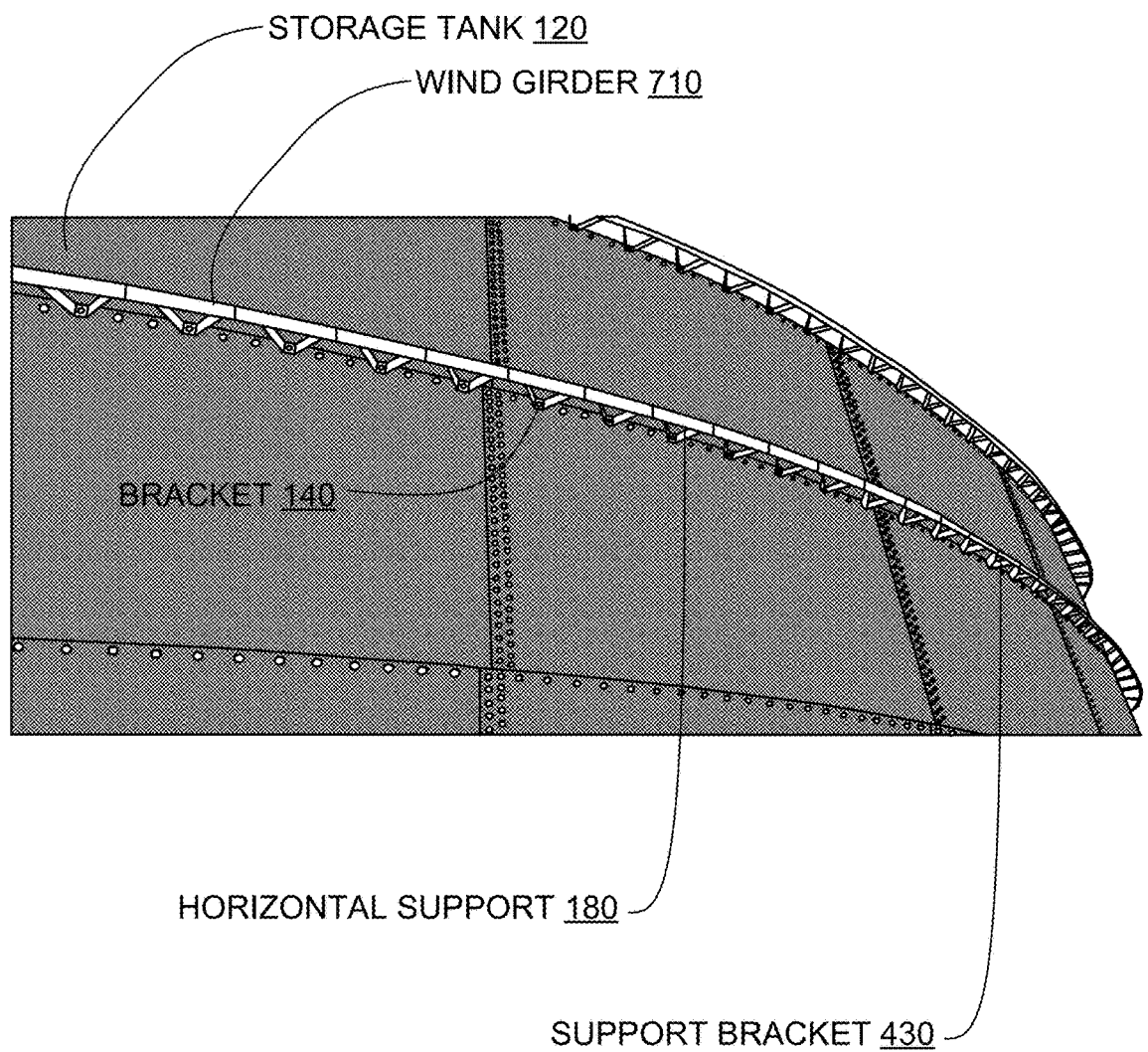
FIG. 7 is an isometric view of a friction stud welded fire-suppression winder girder apparatus, according to an implementation.

FIG. 7 is an isometric view of a friction stud welded fire-suppression wind girder apparatus 700, according to an implementation. The friction stud welded fire-suppression wind girder apparatus 700 includes a wind girder 710 that is attached to a storage tank 120 via friction stud welding. The wind girder 710 is attached to the storage tank 120 via a support bracket 430 which is comprised of horizontal support 180 and friction stud welded bracket 140 that is friction stud welded to storage tank 120 via a fastener (not shown). Examples of the friction stud welded bracket 140 that are operable in the friction stud welded fire-suppression wind girder apparatus 700 are the friction stud welded brackets in FIG. 12-13.

Figure 8:
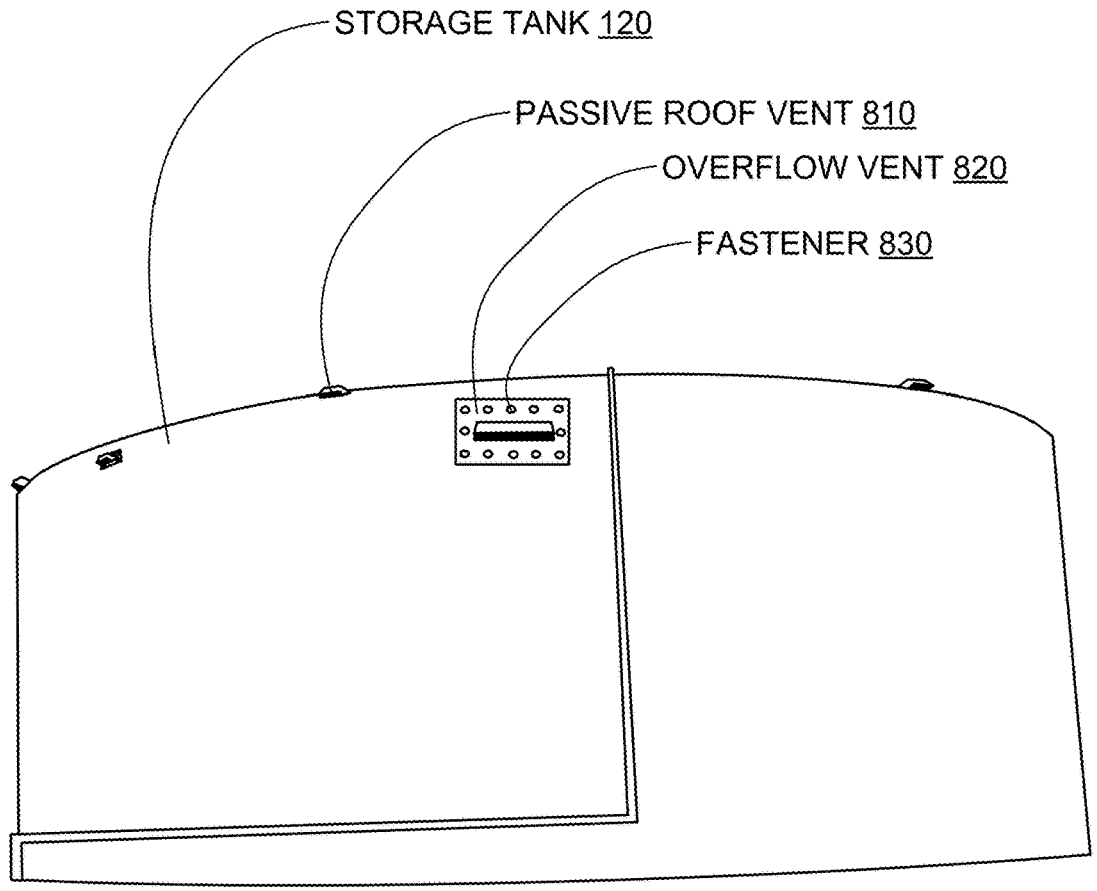
FIG. 8 is an isometric view of a friction stud welded passive roof vent and overflow vent apparatus, according to an implementation.

FIG. 8 is an isometric view of a friction stud welded passive roof vent and overflow vent apparatus 800, according to an implementation. The friction stud welded passive roof vent and overflow vent apparatus 800 includes a passive roof vent 810 that is attached to a storage tank 120 via friction stud welding. The passive roof vent 810 is attached to the storage tank 120 via a fastener 830 that is friction stud welded to the storage tank 120. The friction stud welded passive roof vent and overflow vent apparatus 800 includes an overflow vent 820 that is attached to a storage tank 120 via friction stud welding. The overflow vent 820 is attached to the storage tank 120 via a fastener 830 that is friction stud welded to the storage tank 120. In some implementations, passive roof vent 810 is installed on storage tank 120 without installing overflow vent 820, in some implementations, overflow vent 820 is installed on storage tank 120 without installing passive roof vent 810 and furthermore, in some implementations, both passive roof vent 810 and overflow vent 820 are installed on storage tank 120. In some implementations, holes must be cut in the roof or shell of storage tank 120 to install passive roof vent 810 or overflow vent 820 on storage tank 120. In some implementations, holes may already exist in the roof or shell of storage tank 120 to install passive roof vent 810 or overflow vent 820 on storage tank 120.

Figure 9:
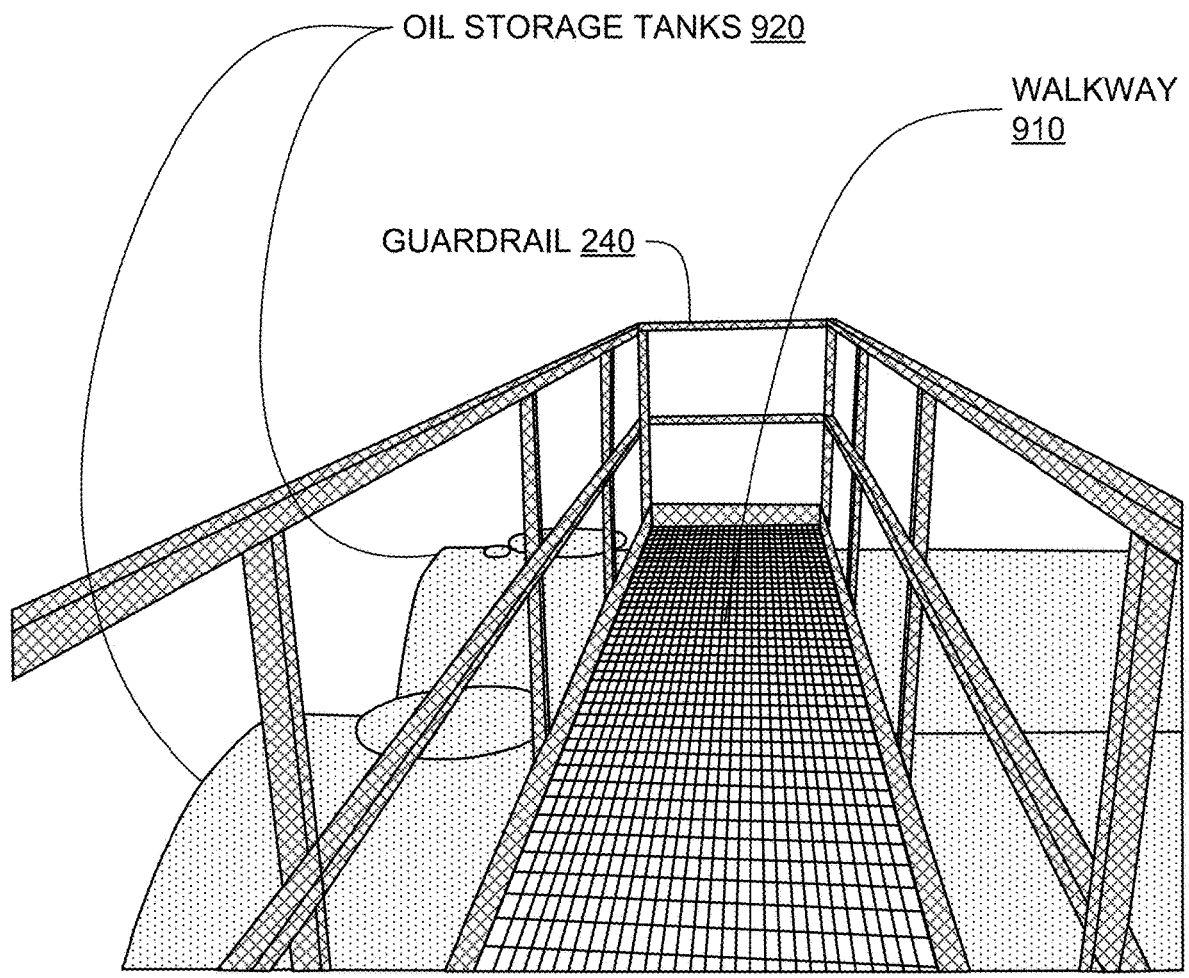
FIG. 9 is an isometric view of a friction stud welded walkway apparatus, according to an implementation.

FIG. 9 is an isometric view of a friction stud welded walkway apparatus 900, according to an implementation. The friction stud welded walkway apparatus 900 includes a walkway 910 that is attached to a guardrail 240 an oil storage tank 920 via friction stud welding. The walkway 910 is attached to the oil storage tank 920 via a friction stud welded fastener (not shown) and a friction stud welded bracket 140 (not shown). Examples of the bracket that are operable in the friction stud welded walkway apparatus 900 are the friction stud welded brackets in FIG. 12-13. Oil storage tank 920 may contain any liquid, gas, solid or powder product.

Figure 10:
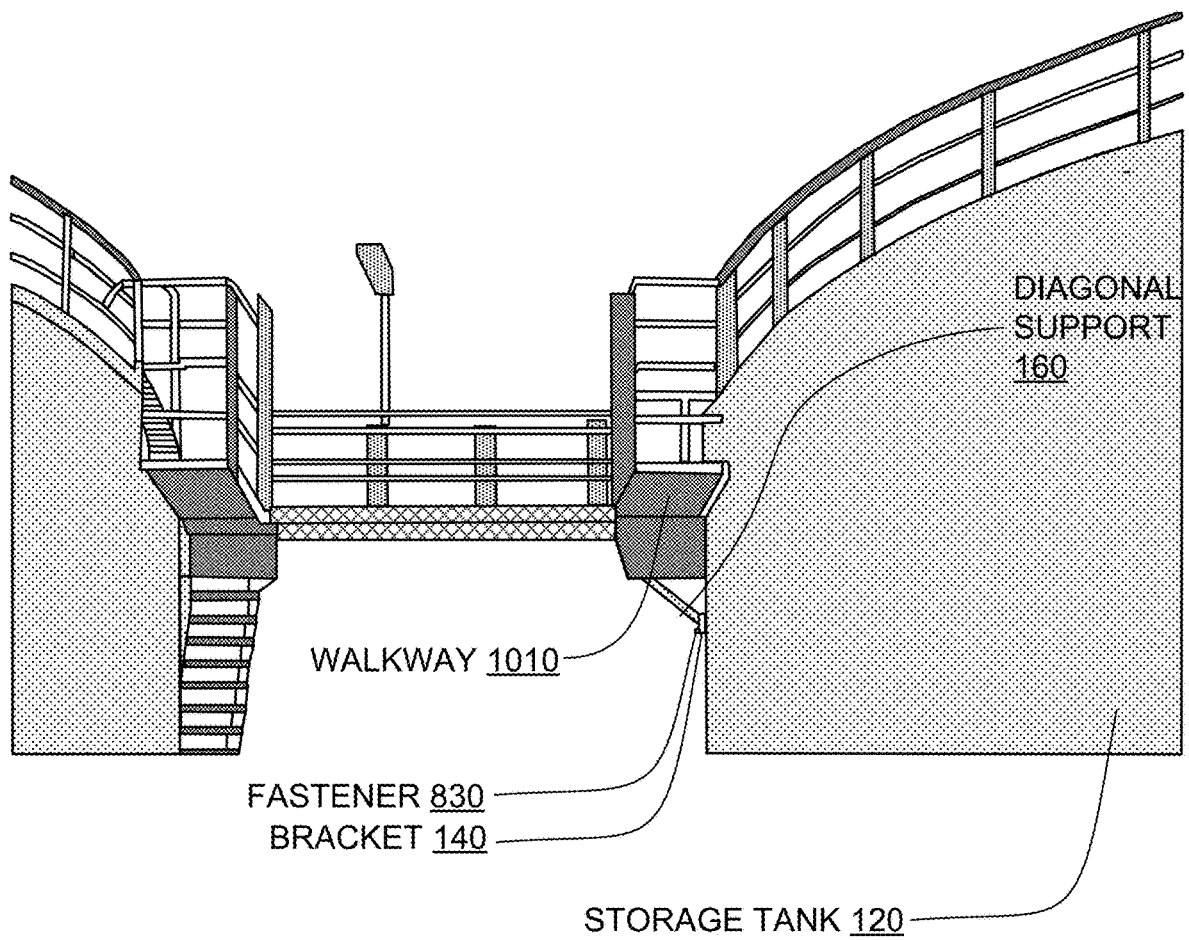
FIG. 10 is an isometric view of a friction stud welded walkway apparatus, according to an implementation.

FIG. 10 is an isometric view of a friction stud welded walkway apparatus 1000, according to an implementation. The friction stud welded walkway apparatus 1000 includes a walkway 1010 that is attached to a storage tank 120 via friction stud welding. The walkway 1010 is attached to the storage tank 120 via diagonal support 160 and a friction stud welded bracket 140 that is friction stud welded to storage tank 120 via a fastener 830. Examples of the friction stud welded bracket 140 that are operable in the friction stud welded walkway apparatus 1000 are the friction stud welded brackets in FIG. 12-13.

Figure 11:
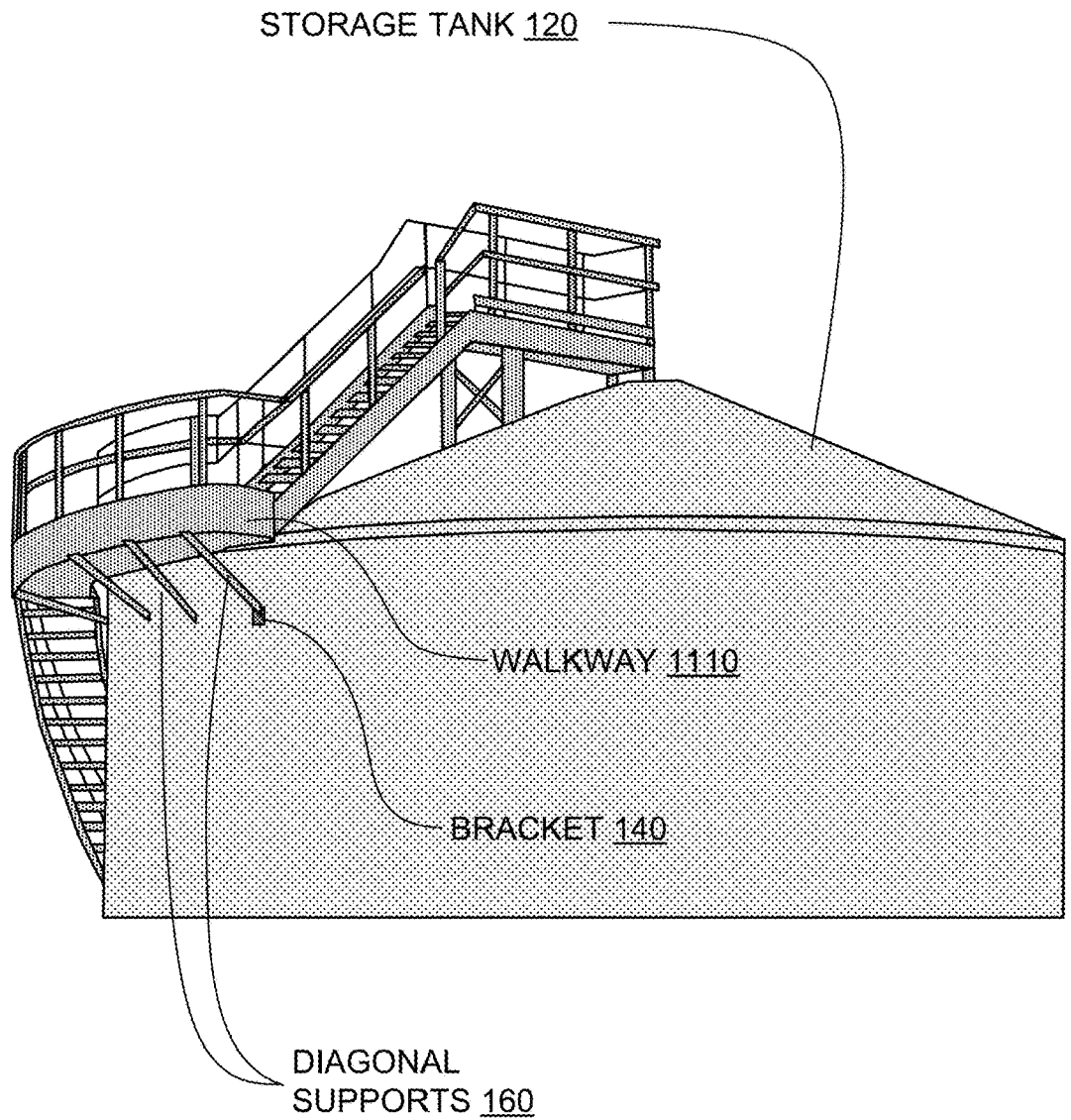
FIG. 11 is an isometric view of a friction stud welded walkway apparatus, according to an implementation.

FIG. 11 is an isometric view of a friction stud welded walkway apparatus 1100, according to an implementation. The friction stud welded walkway apparatus 1100 includes a walkway 1110 that is attached to a storage tank 120 via friction stud welding. The walkway 1110 is attached to the storage tank 120 via diagonal support 160 and a friction stud welded bracket 140 that is friction stud welded to storage tank 120 via a fastener (not shown). Examples of the friction stud welded bracket 140 that are operable in the friction stud welded walkway apparatus 1100 are the friction stud welded brackets in FIG. 12-13.

Figure 12:
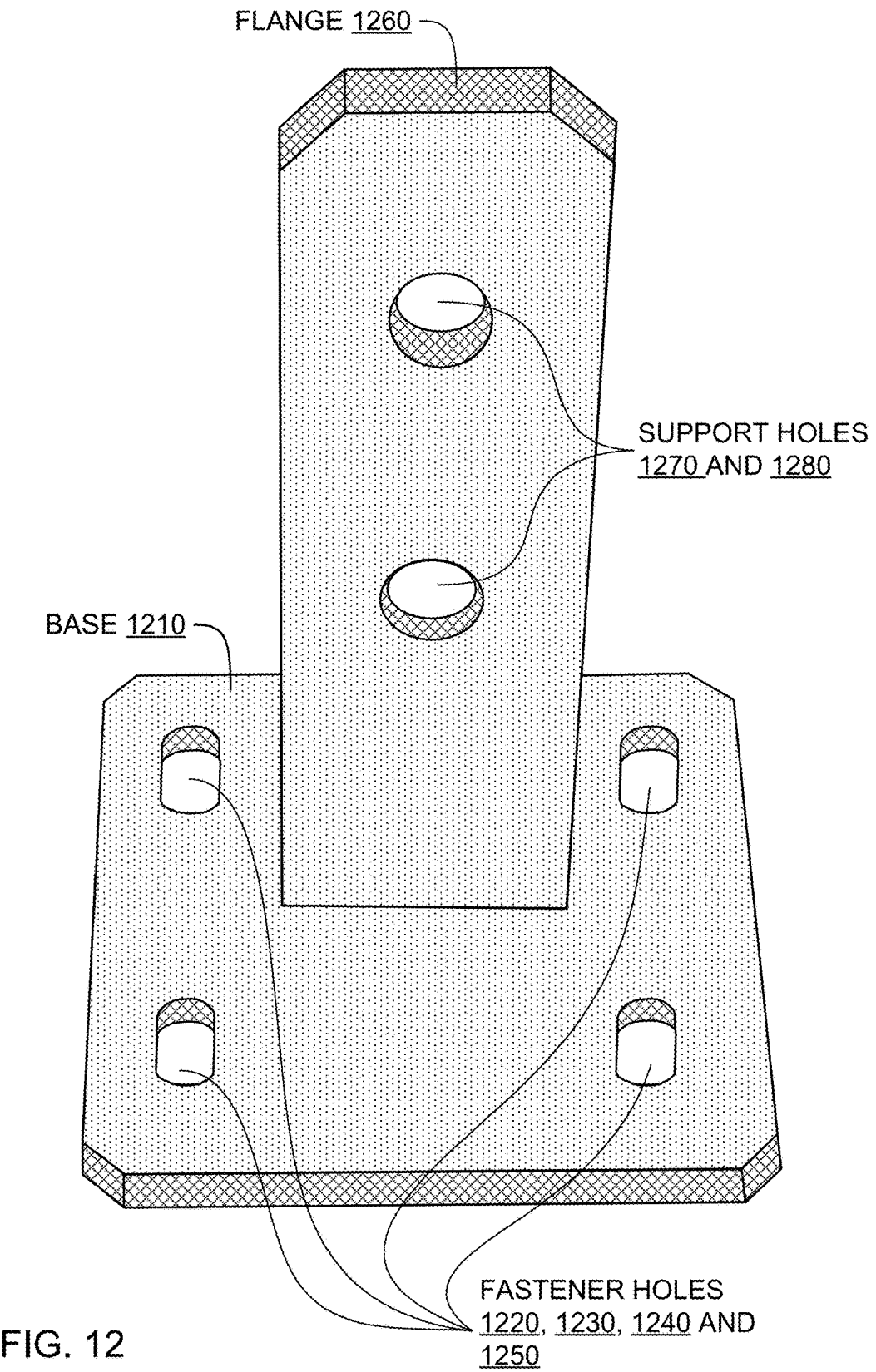
FIG. 12 is an isometric view of a friction stud welded rooftop guardrail bracket (studs not shown) according to an implementation.

FIG. 12 is an isometric view of a friction stud welded rooftop guardrail bracket 1200, according to an implementation. Friction stud welded rooftop guardrail bracket 1200 includes a base 1210 that includes at least one fastener hole, such as fastener holes 1220, 1230, 1240 and 1250 to attach to tanks or structures using friction stud welding. The friction stud welded rooftop guardrail bracket 1200 also includes a flange 1260 that is welded or integrally formed with the base 1210. The flange 1260 includes at least one support hole, such as support holes 1270 and 1280. The friction stud welded rooftop guardrail bracket 1200 is useful in any horizontal, vertical or diagonal surface applications, such as FIG. 19. The friction stud welded rooftop guardrail bracket 1200 may be used to attach appurtenances to structures such as a roof, shell, nozzle, chime or bottom of a tank or other structures.

Figure 13:
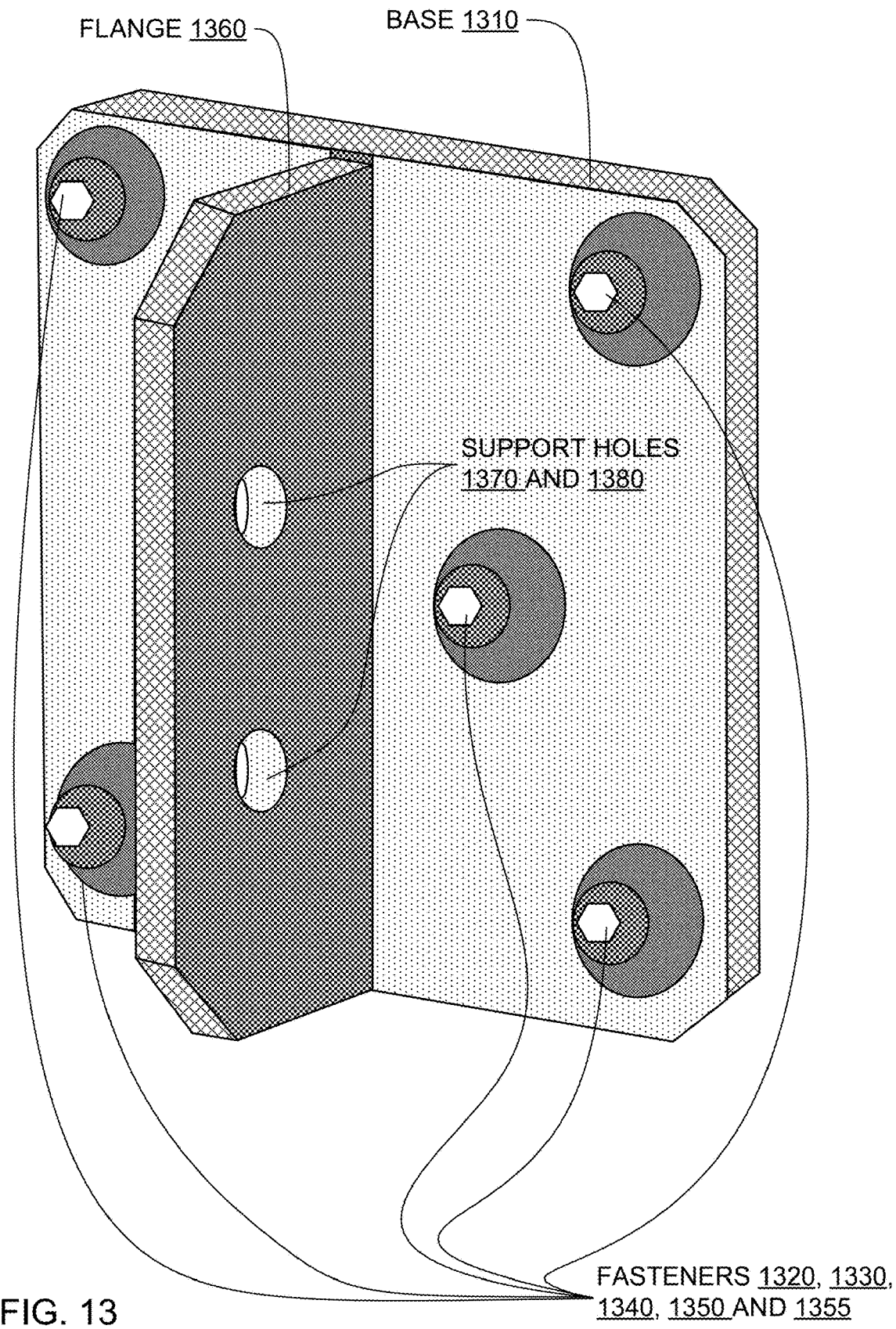
FIG. 13 is an isometric view of a friction stud welded tank shell bracket, according to an implementation.

FIG. 13 is an isometric view of a friction stud welded tank shell bracket 1300, according to an implementation. The friction stud welded tank shell bracket 1300 includes a base 1310 that includes at least one fastener hole, such as holes for fasteners 1320, 1330, 1340, 1350 and 1355. The friction stud welded tank shell bracket 1300 also includes a flange 1360 that is welded or integrally formed with the base 1310. The flange 1360 includes at least one support hole, such as support holes 1370 and 1380. The friction stud welded tank shell bracket 1300 is useful for attaching a vertical or upright post for support of handrails or guardrails or in general for any vertical support post, diagonal support 160, or horizontal support 180. Friction stud welded tank shell bracket 1300 may be used to attach appurtenances to structures such as a roof, shell, nozzle, chime or bottom of a tank or other structures.

Figure 14:
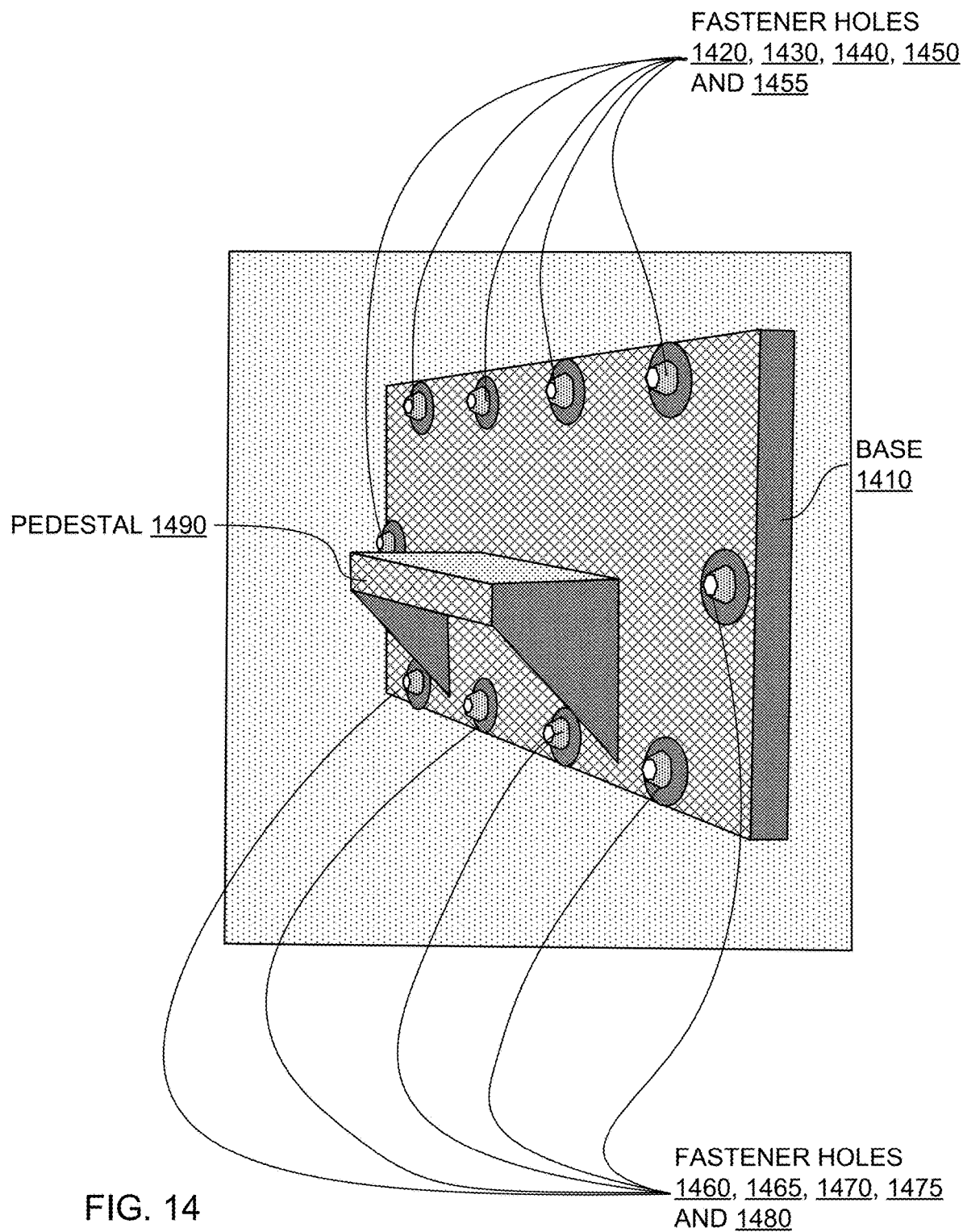
FIG. 14 is an isometric view of a friction stud welded stair repair apparatus, according to an implementation.

FIG. 14 is an isometric view of a friction stud welded stair repair apparatus 1400, according to an implementation. The friction stud welded stair repair apparatus 1400 includes a base 1410 that includes at least one fastener hole, such as holes for fasteners 1420, 1430, 1440, 1450, 1455 1460 1465 1470 1475 and 1480. The friction stud welded stair repair apparatus 1400 also includes a pedestal 1490 that is welded or integrally formed with the base 1410. The pedestal 1490 includes at least one support hole. The friction stud welded stair repair apparatus 1400 is useful for attaching a stair tread (shown in FIG. 36) to the vertical surface of a tank (such as storage tank 120) for support of any supportive or walking surface such as a stairway or a platform.

Figure 15:
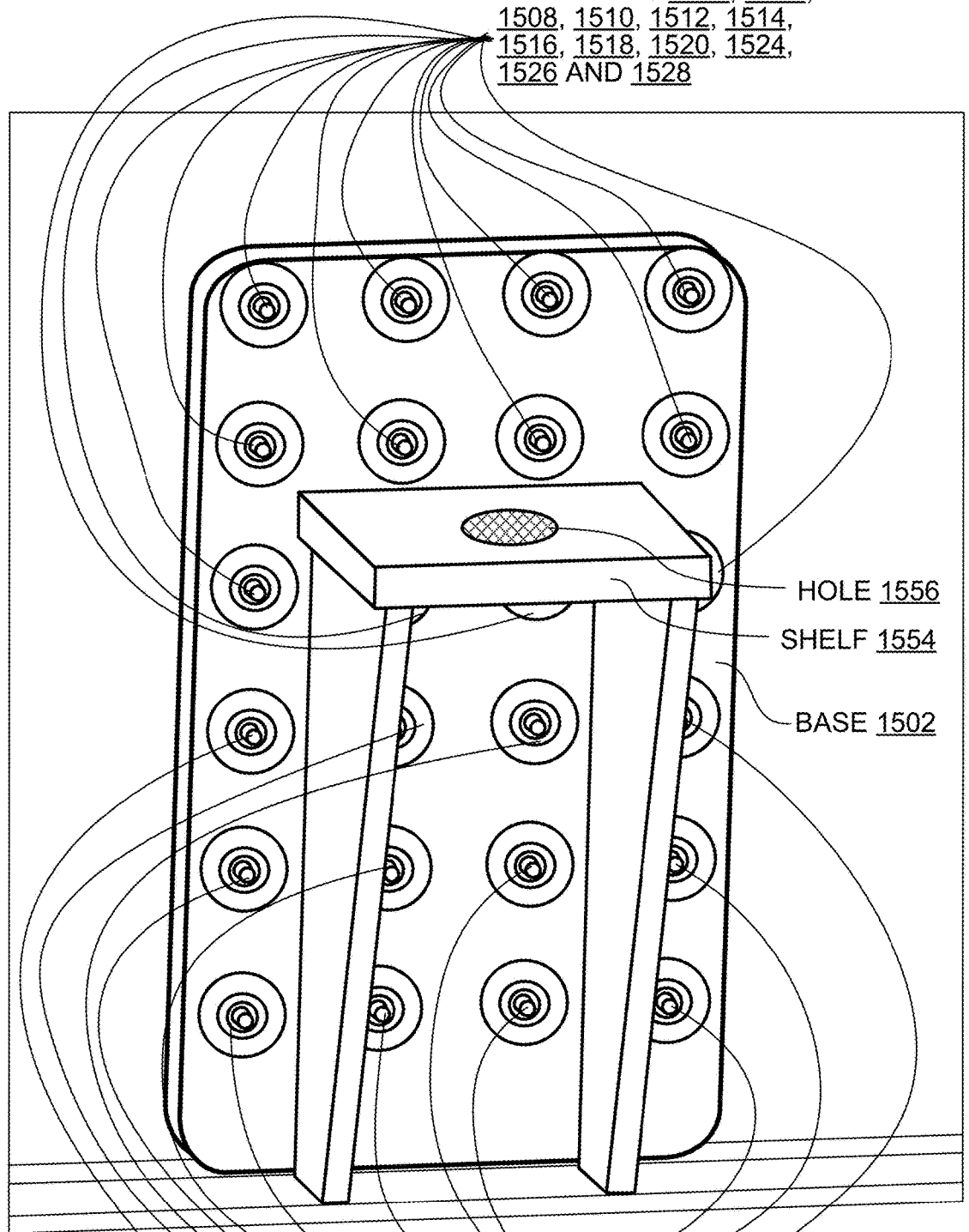
FIG. 15 is an isometric view of an friction stud welded anchor chair, according to an implementation.

FIG. 15 is an isometric view of an friction stud welded anchor chair 1500, according to an implementation. The friction stud welded anchor chair 1500 includes a base 1502 that includes at least one stud, such as studs 1504, 1506, 1508, 1510, 1512, 1514, 1516, 1518, 1520, 1524, 1526, 1528, 1530, 1532, 1534, 1536, 1538, 1540, 1542, 1544, 1546, 1548, 1550 and 1552. The friction stud welded anchor chair 1500 also includes a shelf 1554 that is welded or integrally formed with the base 1502. The shelf 1554 includes at least one hole 1556. The friction stud welded anchor chair 1500 is useful for anchoring a storage tank (such as storage tank 120) to ground or a foundation of the storage tank. After the friction stud welded anchor chair 1500 is installed on the storage tank exterior, a large anchor bolt is installed through the one hole 1556 and the large anchor bolt is driven or anchored into the foundation (i.e. concrete slab) or the ground.

Figure 16:
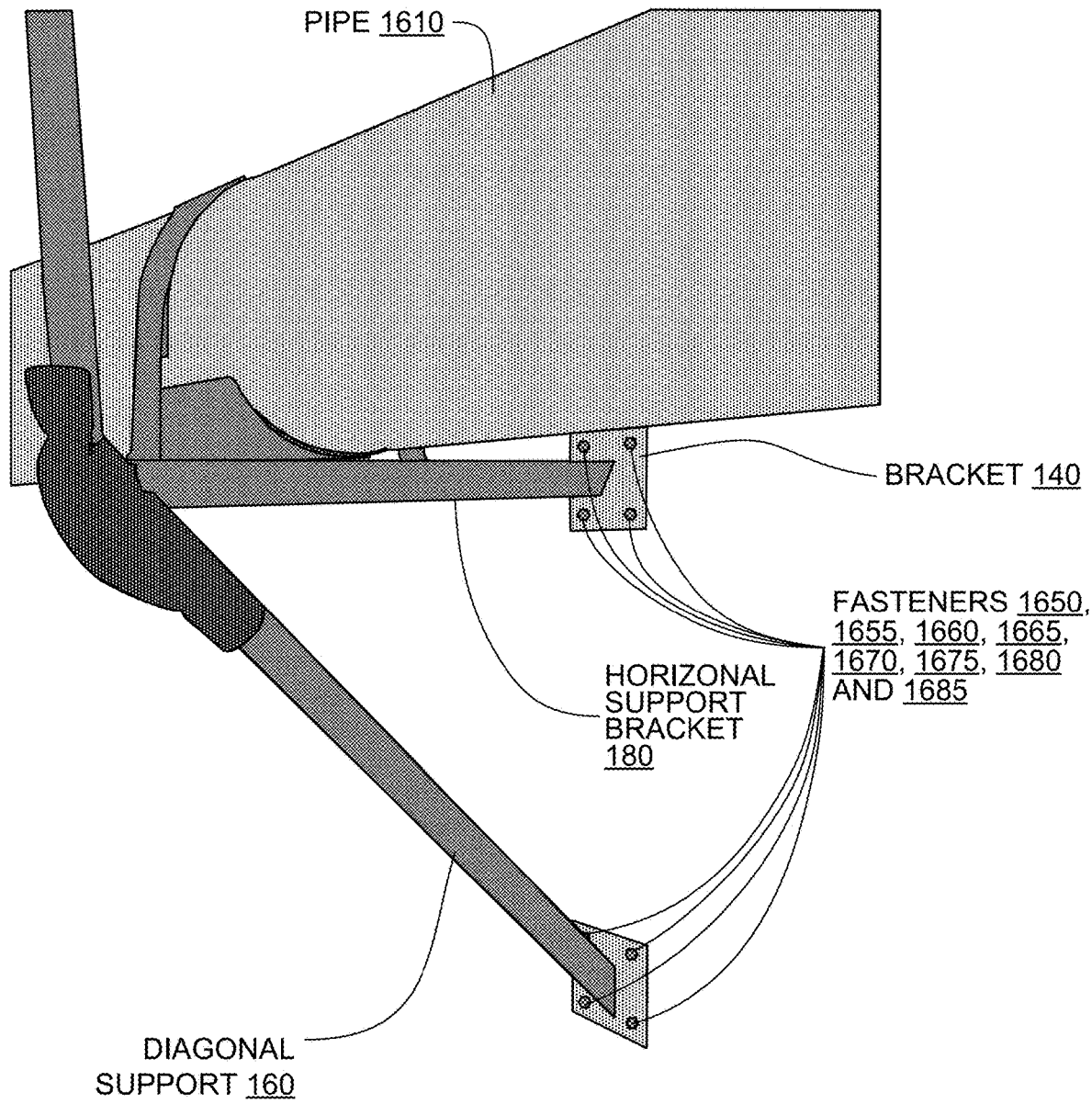
FIG. 16 is an isometric view of a friction stud welded pipe support apparatus 1600, according to an implementation.

FIG. 16 is an isometric view of a friction stud welded pipe support apparatus 1600, according to an implementation. The friction stud welded pipe support apparatus 1600 includes a pipe 1610 that is attached to storage tank 120 via friction stud welding. The pipe 1610 is attached to the storage tank 120 via diagonal support 160, horizontal support 180 and friction stud welded brackets 140 that are friction stud welded to storage tank 120 via fasteners, such as fasteners 1650, 1655, 1660, 1665, 1670, 1675, 1680 and 1685, that comprise a stud and a nut; or a stud, nut and a washer. Examples of the friction stud welded brackets 140 that are operable in the friction stud welded pipe support apparatus 1600 are the friction stud welded brackets in FIG. 12-13.

Figure 17:
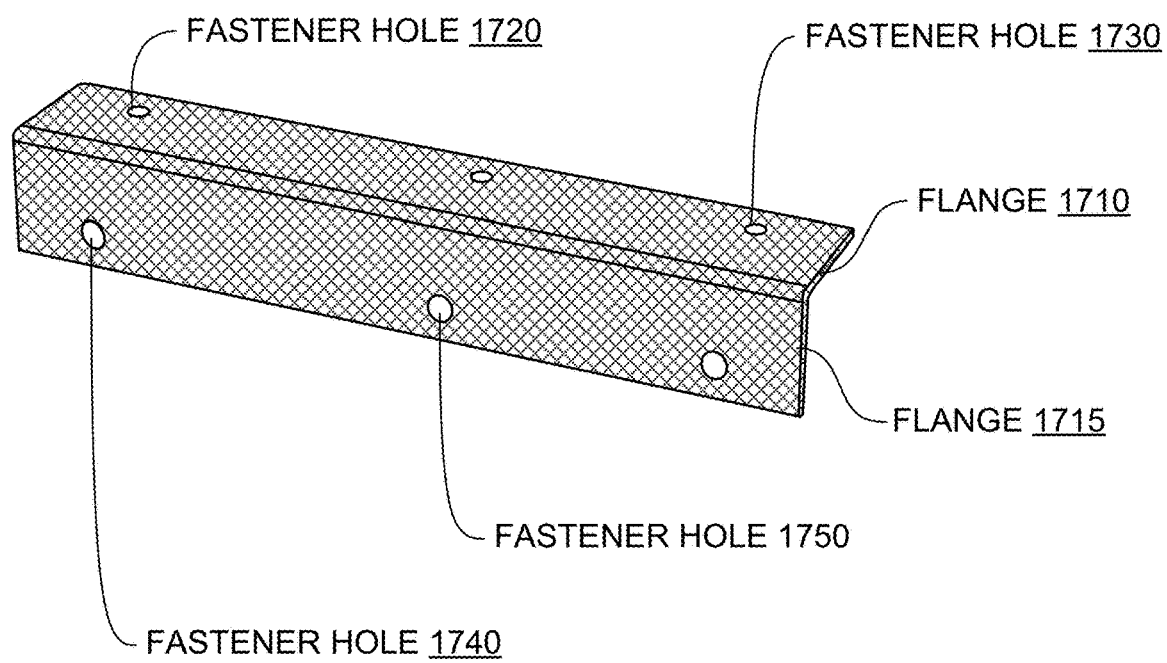
FIG. 17 is an isometric view of a friction stud welded stair tread support bracket (studs not shown) 1700, according to an implementation.

FIG. 17 is an isometric view of a friction stud welded stair tread support bracket 1700, according to an implementation. The friction stud welded stair tread support bracket 1700 includes two flanges 1710 and 1715 that are welded or integrally formed together. The two flanges 1710 and 1715 include at least one fastener hole, such as fastener holes 1720, 1730, 1740 and 1750. The friction stud welded stair tread support bracket 1700 is useful for attaching a vertical or upright post for support of guardrails or handrails. The friction stud welded stair tread support bracket 1700 is also useful for attaching shelving, platforms, manways, grating, or stair treads for stairways or in general for attaching any appurtenance.

Figure 18:
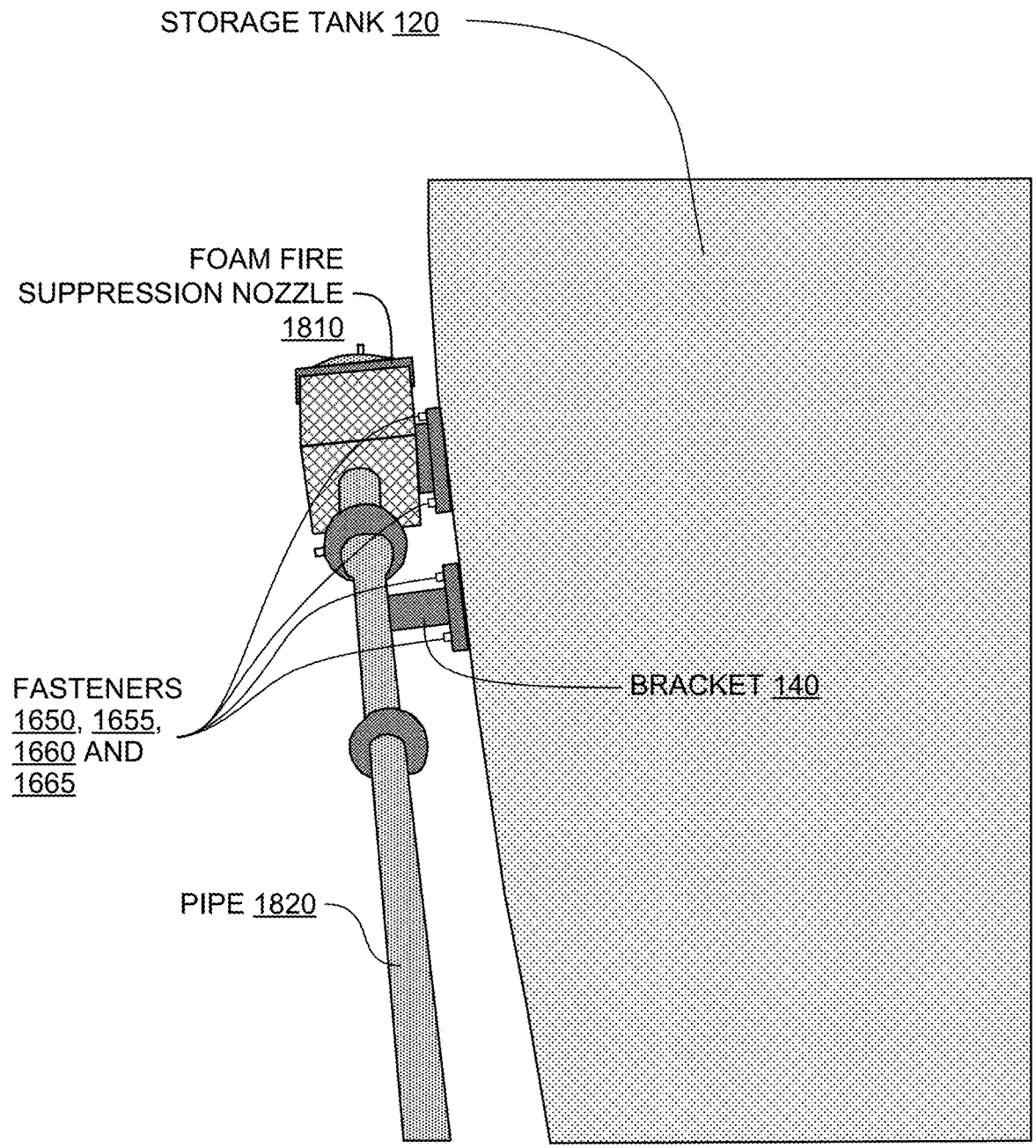
FIG. 18 is an isometric view of a friction stud welded foam discharge apparatus 1800, according to an implementation.

FIG. 18 is an isometric view of a friction stud welded foam discharge apparatus 1800, according to an implementation. The friction stud welded foam discharge apparatus 1800 includes a foam fire suppression nozzle 1810 that is attached to a pipe 1820. The foam fire suppression nozzle 1810 is attached to a storage tank 120 via a friction stud welded bracket 140 that is friction stud welded to the storage tank 120 via fasteners, such as fasteners 1650, 1655, 1660 and 1665. Examples of the friction stud welded bracket 140 that are operable in the friction stud welded foam discharge apparatus 1800 are the friction stud welded brackets in FIG. 12-13.

Figure 19:
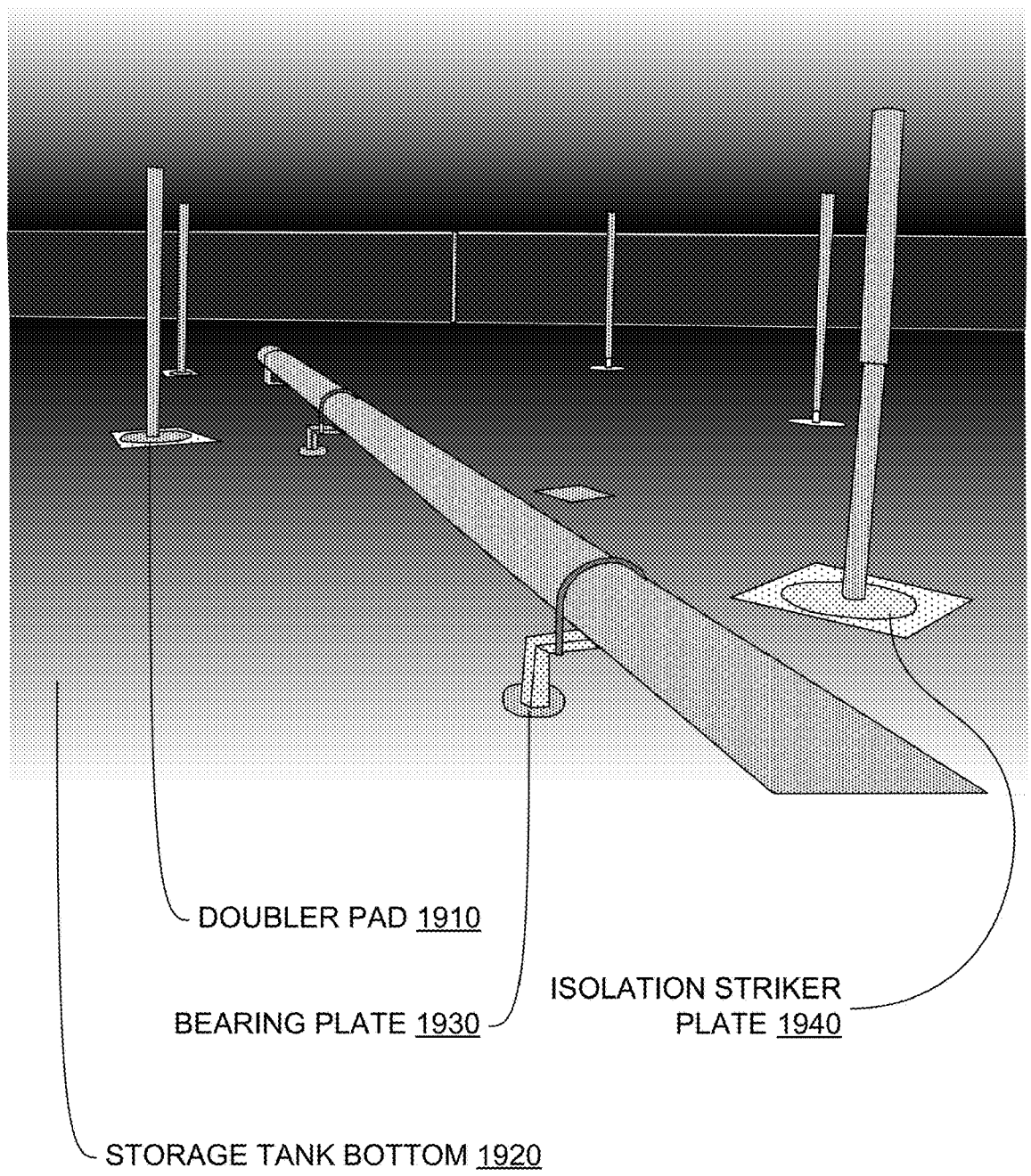
FIG. 19 is an isometric view of a friction stud welded floor plate apparatus, according to an implementation.

FIG. 19 is an isometric view of a friction stud welded floor plate apparatus 1900, according to an implementation. The friction stud welded floor plate apparatus 1900 includes a doubler pad 1910 that is attached to a storage tank bottom 1920 via friction stud welding. The doubler pad 1910 is attached to the storage tank bottom 1920 via a fastener (not shown) that is friction stud welded to the storage tank bottom 1920. The friction stud welded floor plate apparatus 1900 includes a bearing plate 1930 that is attached to a storage tank bottom 1920 via a friction stud welded fastener. The bearing plate 1930 is attached to the storage tank bottom 1920 via a fastener (not shown) that is friction stud welded to the storage tank bottom 1920. The friction stud welded floor plate apparatus 1900 includes an isolation striker plate 1940 that is attached to a storage tank bottom 1920 via friction stud welding. The isolation striker plate 1940 is attached to the storage tank bottom 1920 via a fastener (not shown) that is friction stud welded to the storage tank bottom 1920.

Figure 20:
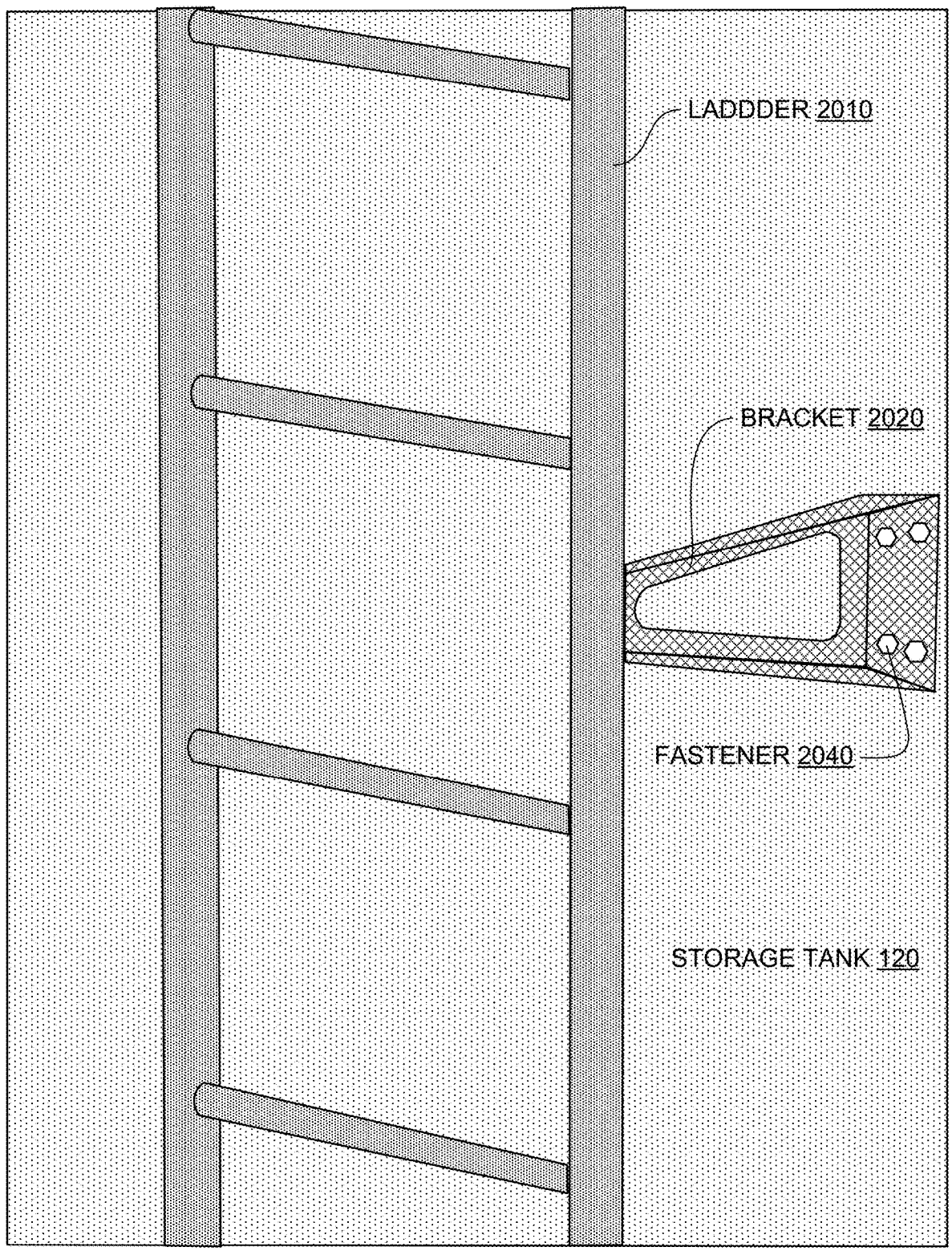
FIG. 20 is an isometric view of a friction stud welded ladder apparatus, according to an implementation.

FIG. 20 is an isometric view of a friction stud welded ladder apparatus 2000, according to an implementation. The friction stud welded ladder apparatus 2000 includes a ladder 2010 that is attached to a storage tank 120 via friction stud welding. The ladder 2010 is attached to the storage tank 120 via a bracket 2020 that is friction stud welded to storage tank 120 via at least one fastener, such as fastener 2040. Ladder 2010 may be supported at ground level or it may be supported in full by more than one bracket 2020.

Figure 21:
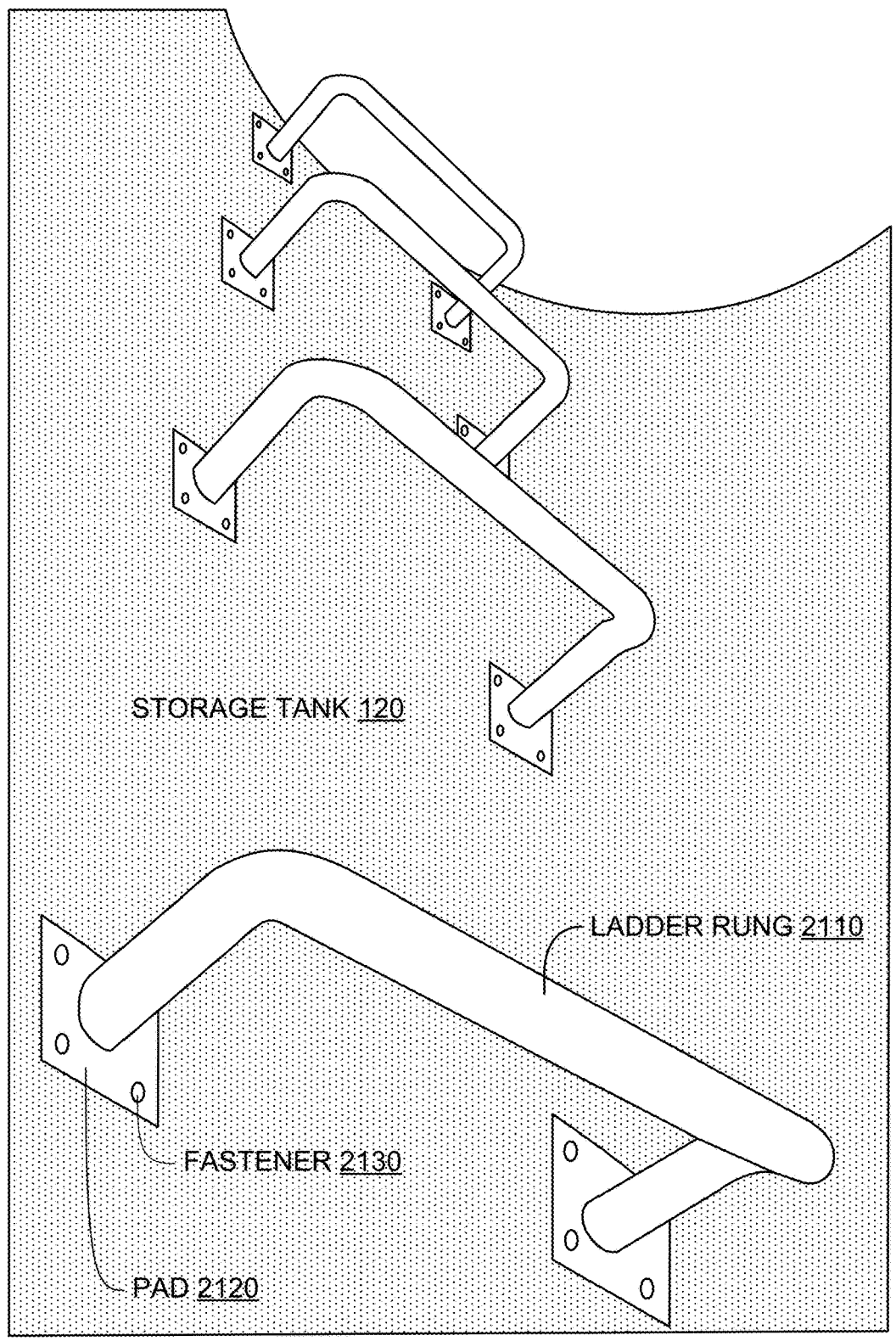
FIG. 21 is an isometric view of a friction stud welded ladder rung, according to an implementation.

FIG. 21 is an isometric view of a friction stud welded ladder rung 2100, according to an implementation. The friction stud welded ladder rung 2100 includes a ladder rung 2110 that is attached to storage tank 120 via friction stud welding. The ladder rung 2110 is attached to the storage tank 120 via a pad 2120 that is friction stud welded to storage tank 120 via a fastener, such as fastener 2130.

Figure 22:
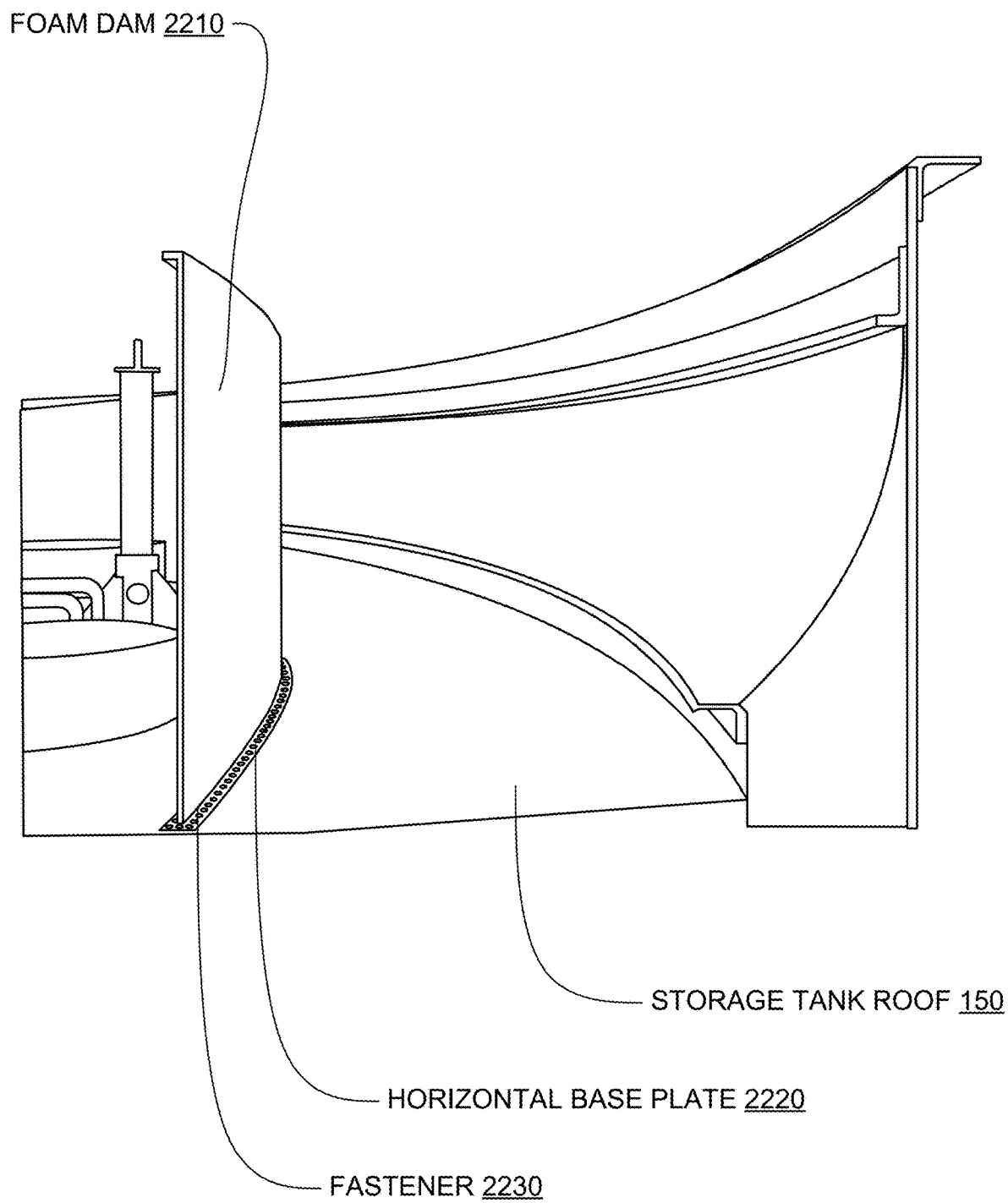
FIG. 22 is an isometric view of a friction stud welded foam dam, according to an implementation.

FIG. 22 is an isometric view of a friction stud welded foam dam 2200, according to an implementation. The friction stud welded foam dam 2200 includes a foam dam 2210 that is attached to the roof of storage tank 120 via friction stud welding. The foam dam 2210 is attached to the roof of storage tank 120 via a horizontal base plate 2220 that is friction stud welded to the roof of storage tank 120 via a fastener, such as fastener 2230.

Figure 23:
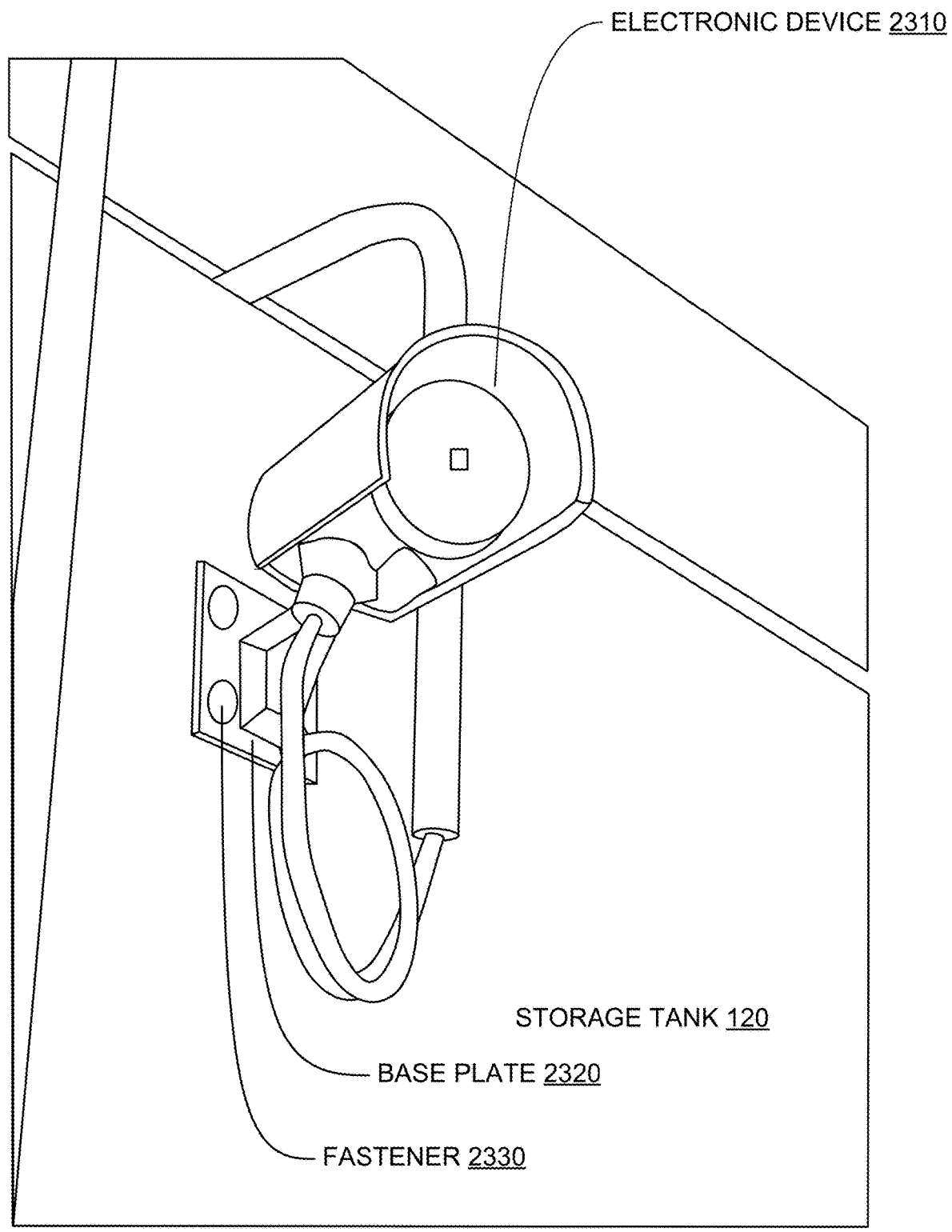
FIG. 23 is an isometric view of a friction stud welded electronic device, according to an implementation.

FIG. 23 is an isometric view of a friction stud welded electronic device 2300, according to an implementation. The friction stud welded electronic device 2300 includes an electronic device 2310 that is attached to storage tank 120 via friction stud welding. The electronic device 2310 is attached to the storage tank 120 via a base plate 2320 that is friction stud welded to storage tank 120 via a fastener, such as fastener 2330. Examples of the electronic devices include cameras (as shown in FIG. 23), instrumentation, gauges, alarms, lighting, monitors, sensors, security devices and sirens.

Figure 24:
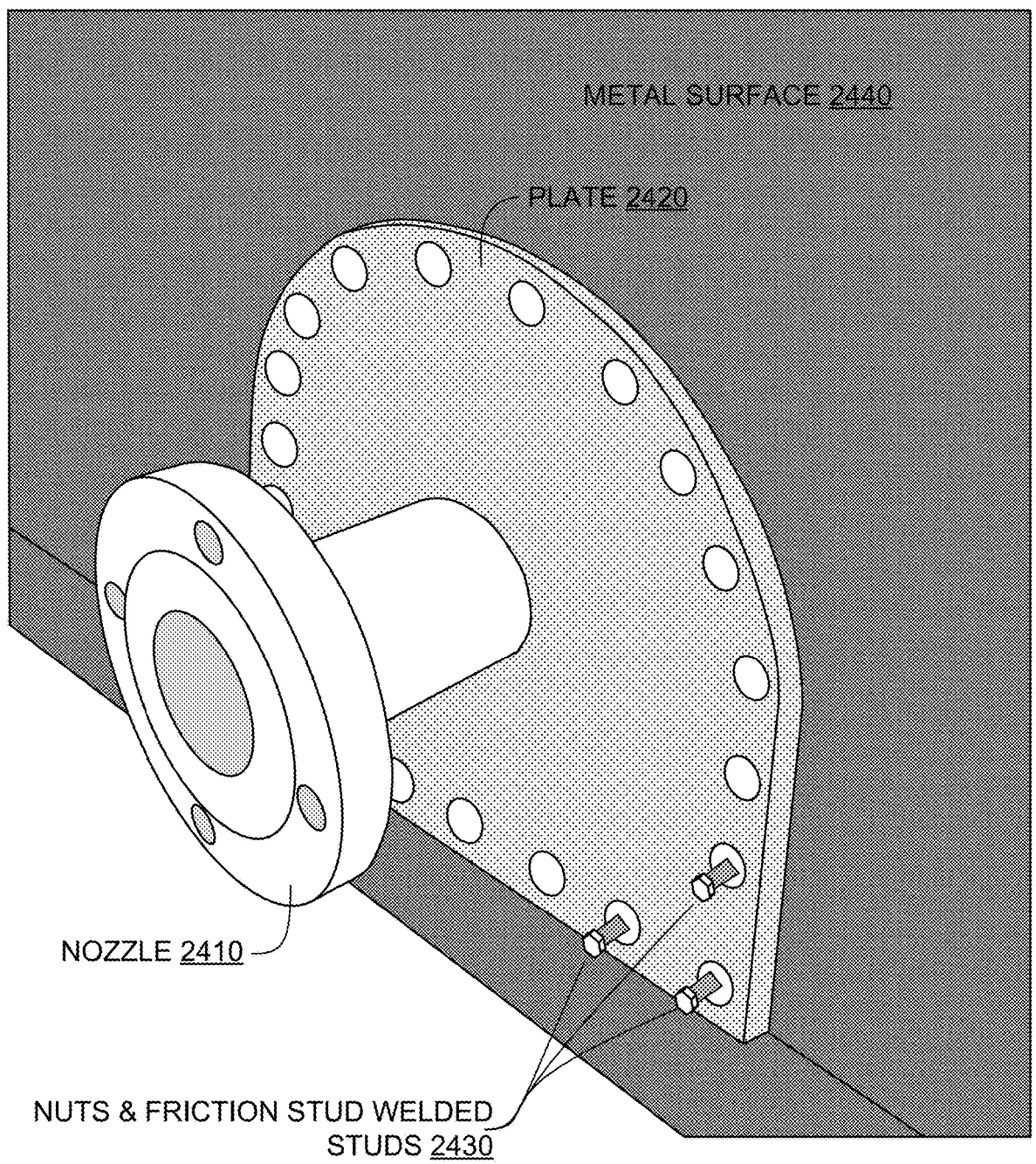
FIG. 24 is an isometric view of a friction stud welded nozzle, according to an implementation.

FIG. 24 is an isometric view of a friction stud welded nozzle 2400, according to an implementation. The friction stud welded nozzle 2400 includes a nozzle 2410 that is operably coupled to a plate 2420 and a number of nuts & friction stud welded studs 2430 that are connected to a metal surface 2440 which may be the shell of storage tank 120. Friction stud welded nozzles may or may not be designed to support the hoop stress in the tank shell.

Figure 25:
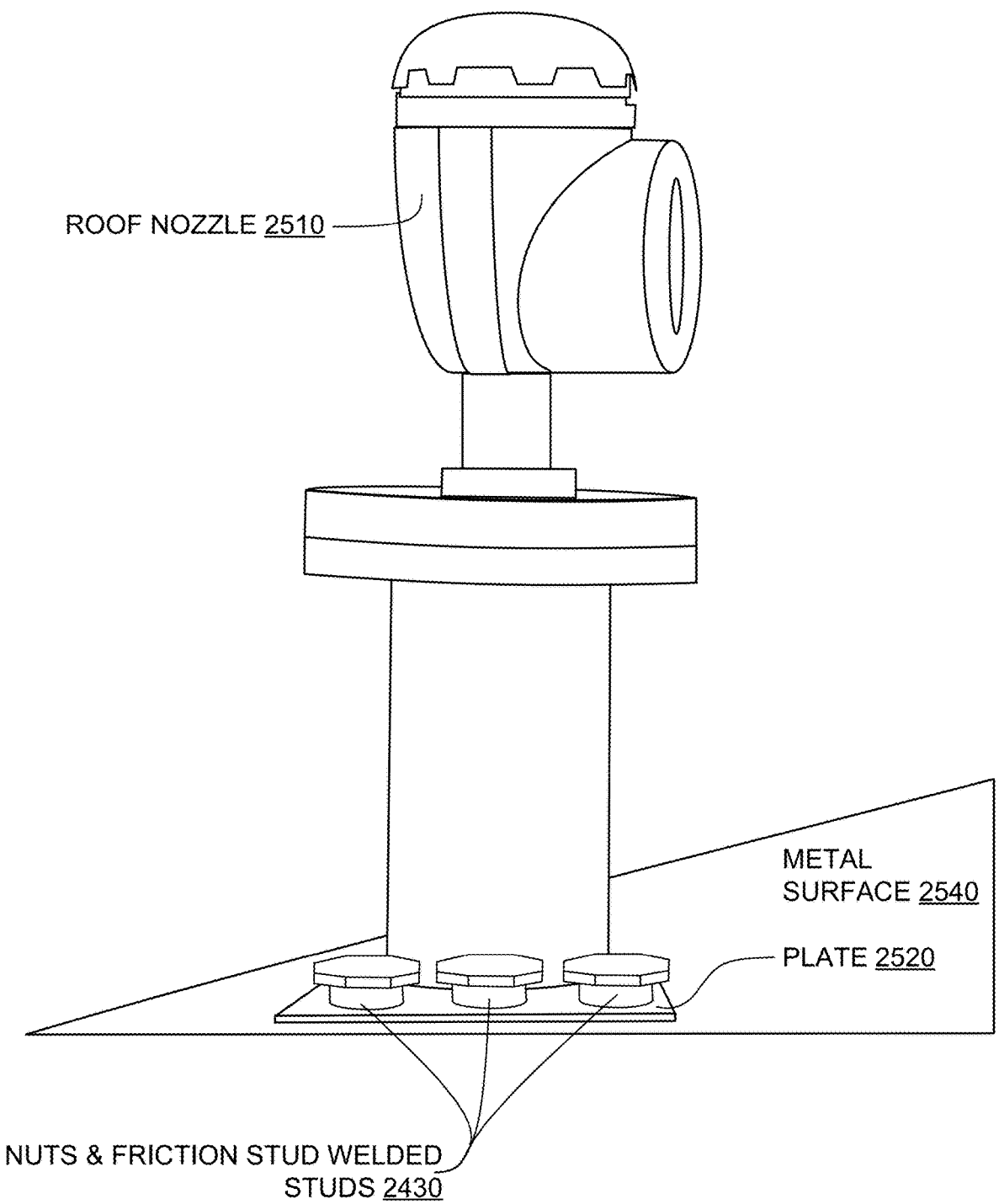
FIG. 25 is an isometric view of a friction stud welded roof nozzle, according to an implementation.

FIG. 25 is an isometric view of a friction stud welded roof nozzle 2500, according to an implementation. The friction stud welded roof nozzle 2500 includes a nozzle 2510 that is operably coupled to a plate 2520 and a number of nuts & friction stud welded studs 2530 that are connected to a metal surface 2540 which may be a fixed or floating roof of a storage tank 120.

Figure 26:
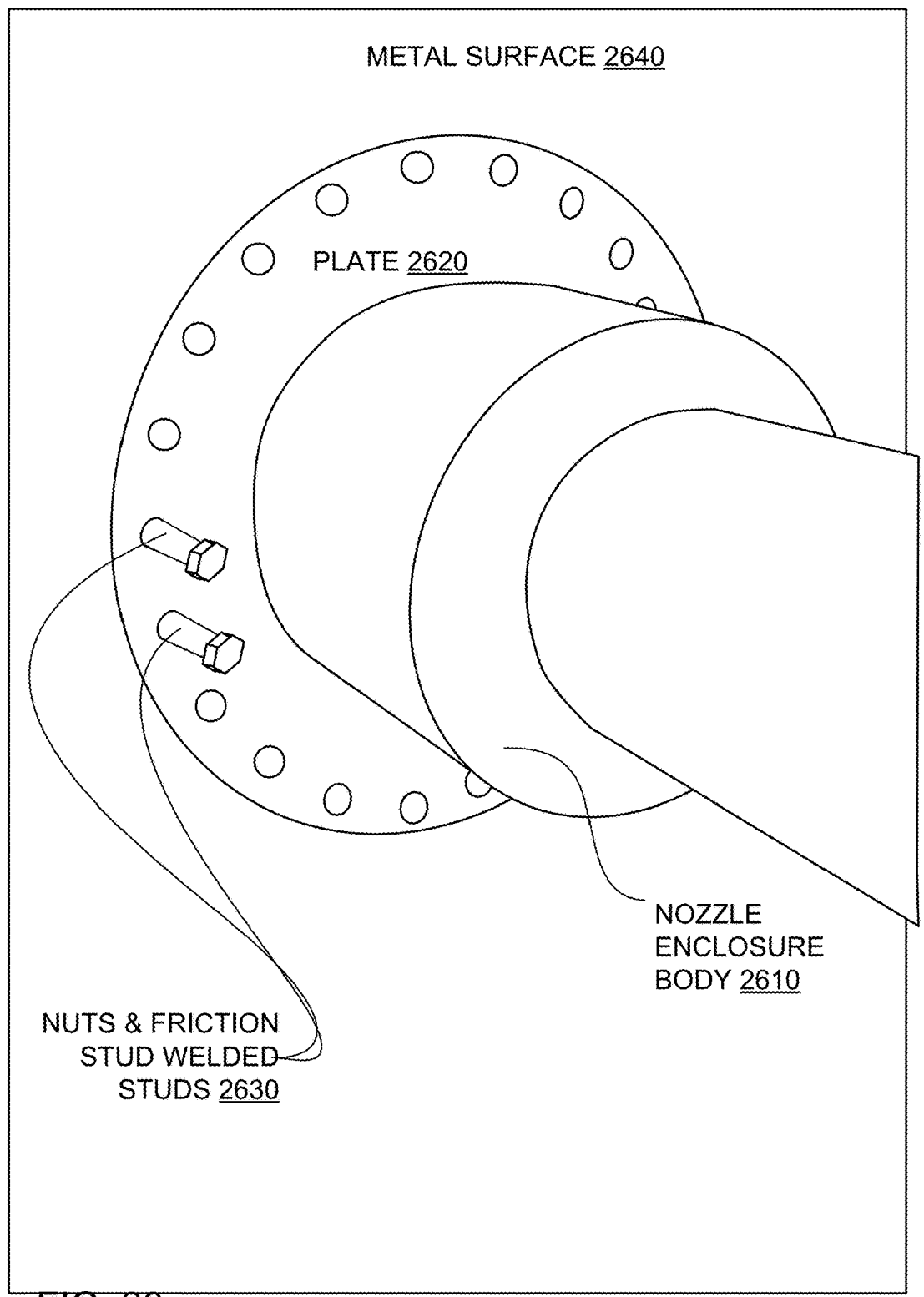
FIG. 26 is an isometric view of a friction stud welded nozzle enclosure, according to an implementation.

FIG. 26 is an isometric view of a friction stud welded nozzle enclosure 2600, according to an implementation. The friction stud welded nozzle enclosure 2600 includes a nozzle enclosure body 2610 that is operably coupled to a bolt plate 2620 and a number of nuts & friction stud welded studs 2630 that are used to bolt the bolt plate 2620 to metal surface 2640 which may be the shell of storage tank 120.

Figure 27:
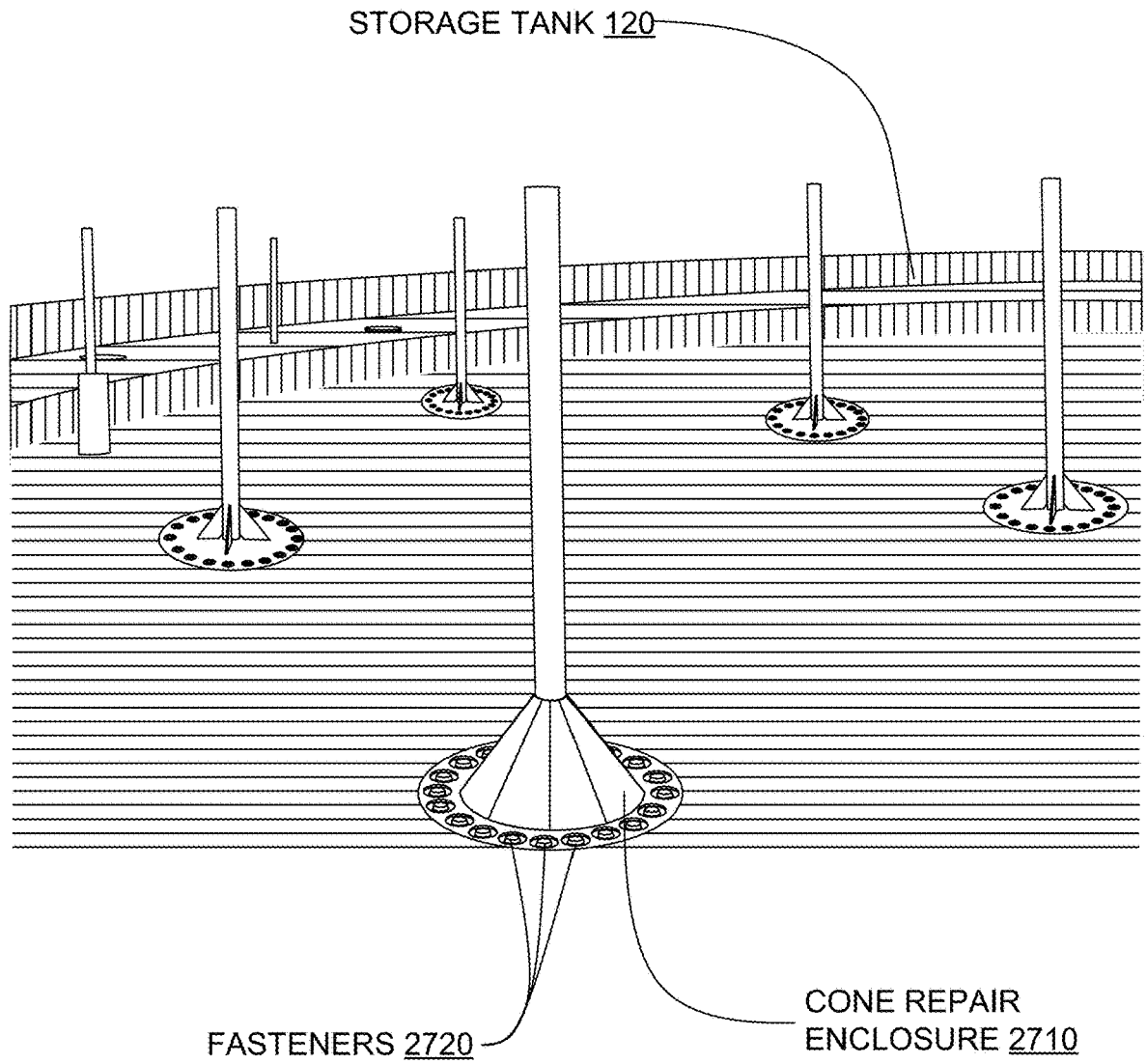
FIG. 27 is an isometric view of a friction stud welded tank roof leg repair enclosure, according to an implementation.

FIG. 27 is an isometric view of a friction stud welded tank roof leg repair enclosure 2700, according to an implementation. The friction stud welded tank roof leg repair enclosure 2700 includes a cone repair enclosure 2710 and fasteners 2720. The fasteners 2720 have a friction welded stud that creates an fastener for bolting cone repair enclosure 2710 to the roof of storage tank 120.

Figure 28:
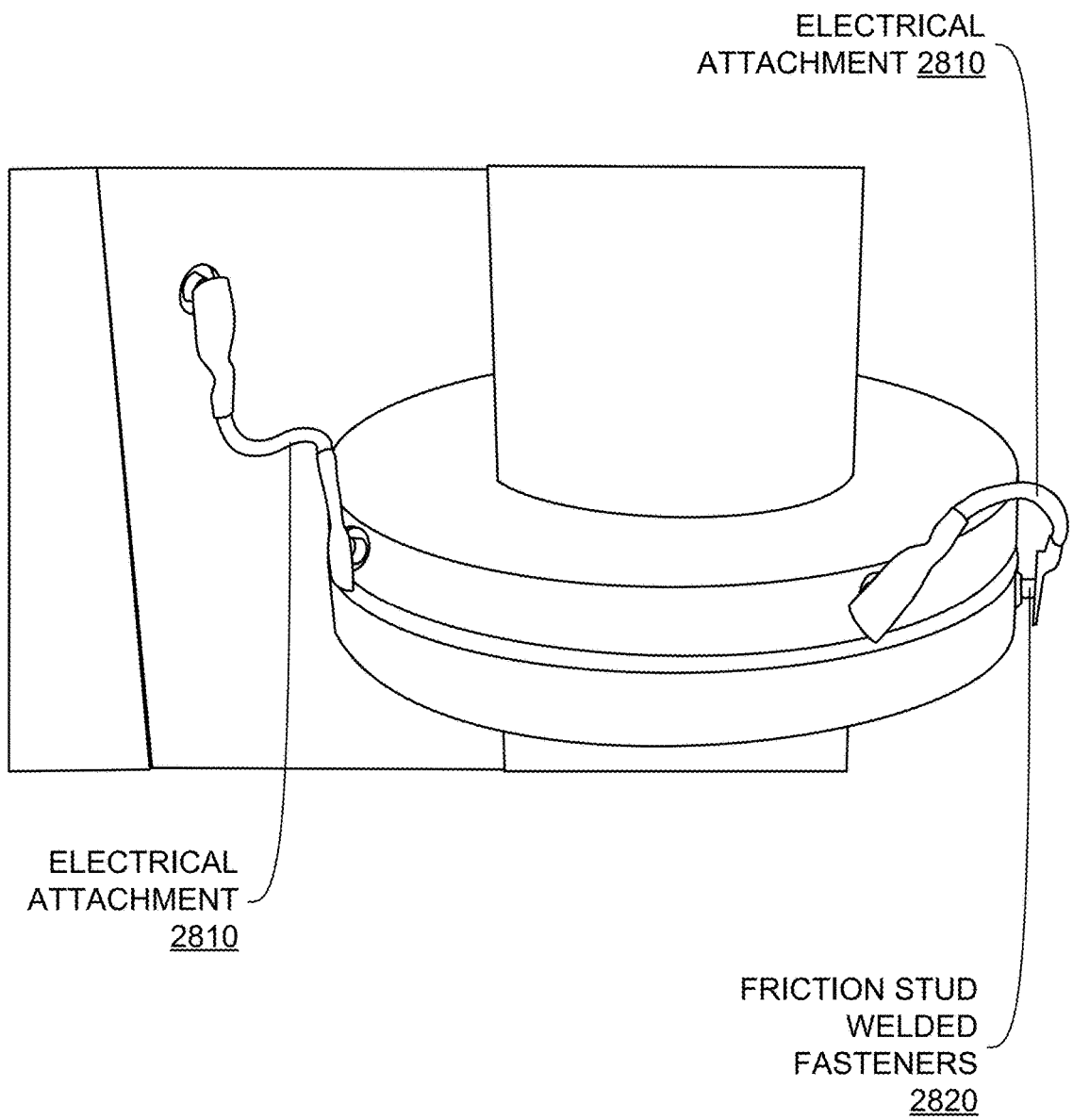
FIG. 28 is an isometric view of friction stud welded anode/cathode attachments, according to an implementation.

FIG. 28 is an isometric view of friction stud welded anode/cathode attachments 2800, according to an implementation. A friction stud welded fastener makes an excellent electrical connection with high conductivity and low resistance, which can be used to connect anode and cathode lugs to metal structures and devices. The friction stud welded anode/cathode attachments 2800 includes electrical attachments 2810 and friction stud welded fastener 2820 that are electrically attached through the friction stud welded fastener to the surface being protected from corrosion. In FIG. 28, these electrical attachments may allow cathodic protection currents to pass across the flange which may have an insulating gasket.

Figure 29:
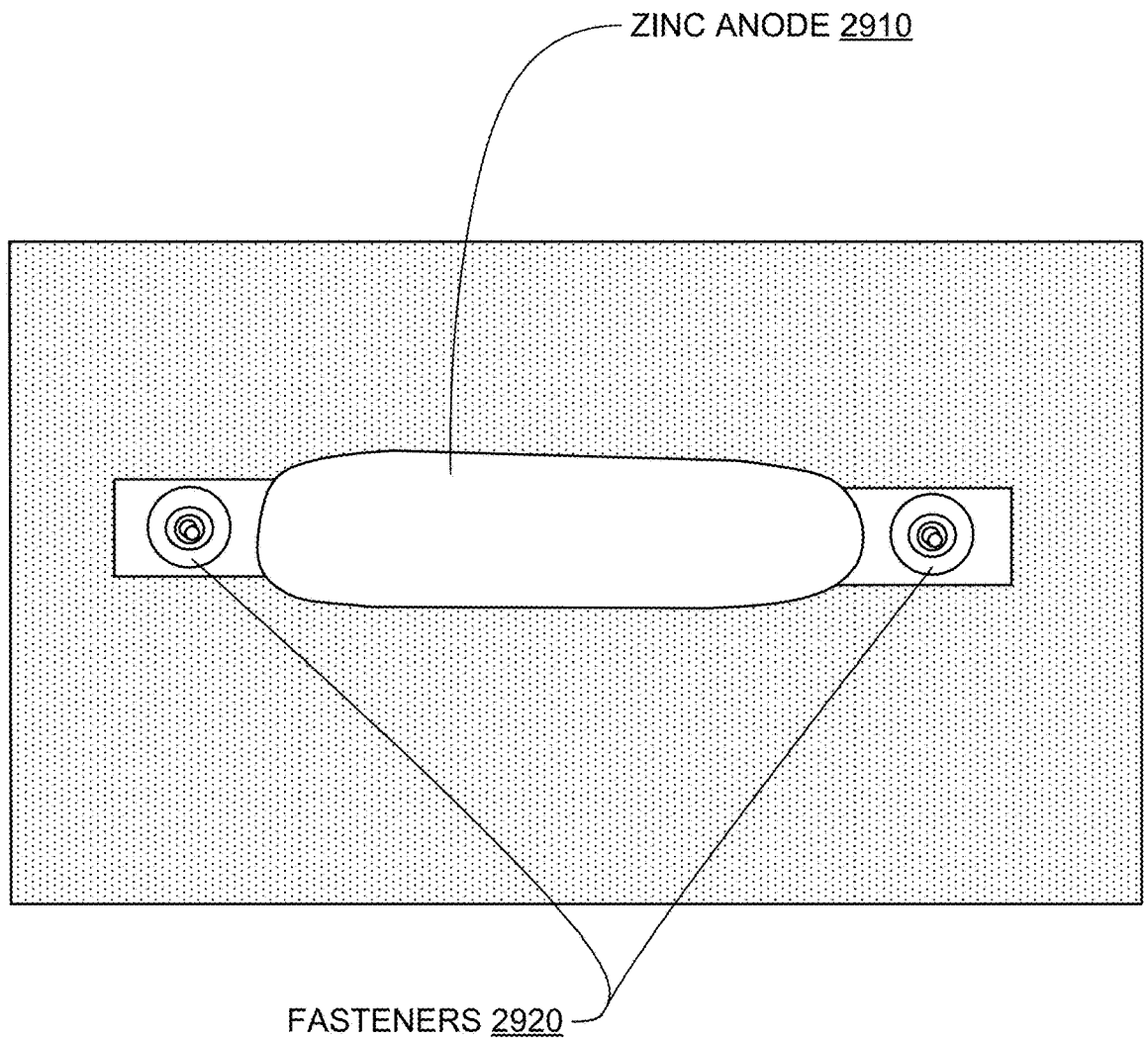
FIG. 29 is an isometric view of a friction stud welded anode, according to an implementation.

FIG. 29 is an isometric view of a friction stud welded anode 2900, according to an implementation. The friction stud welded anode 2900 includes an anode 2910 and friction stud welded fasteners 2920 that are electrically attached through the friction stud welded fasteners to the surface being protected from corrosion.

Figure 30:
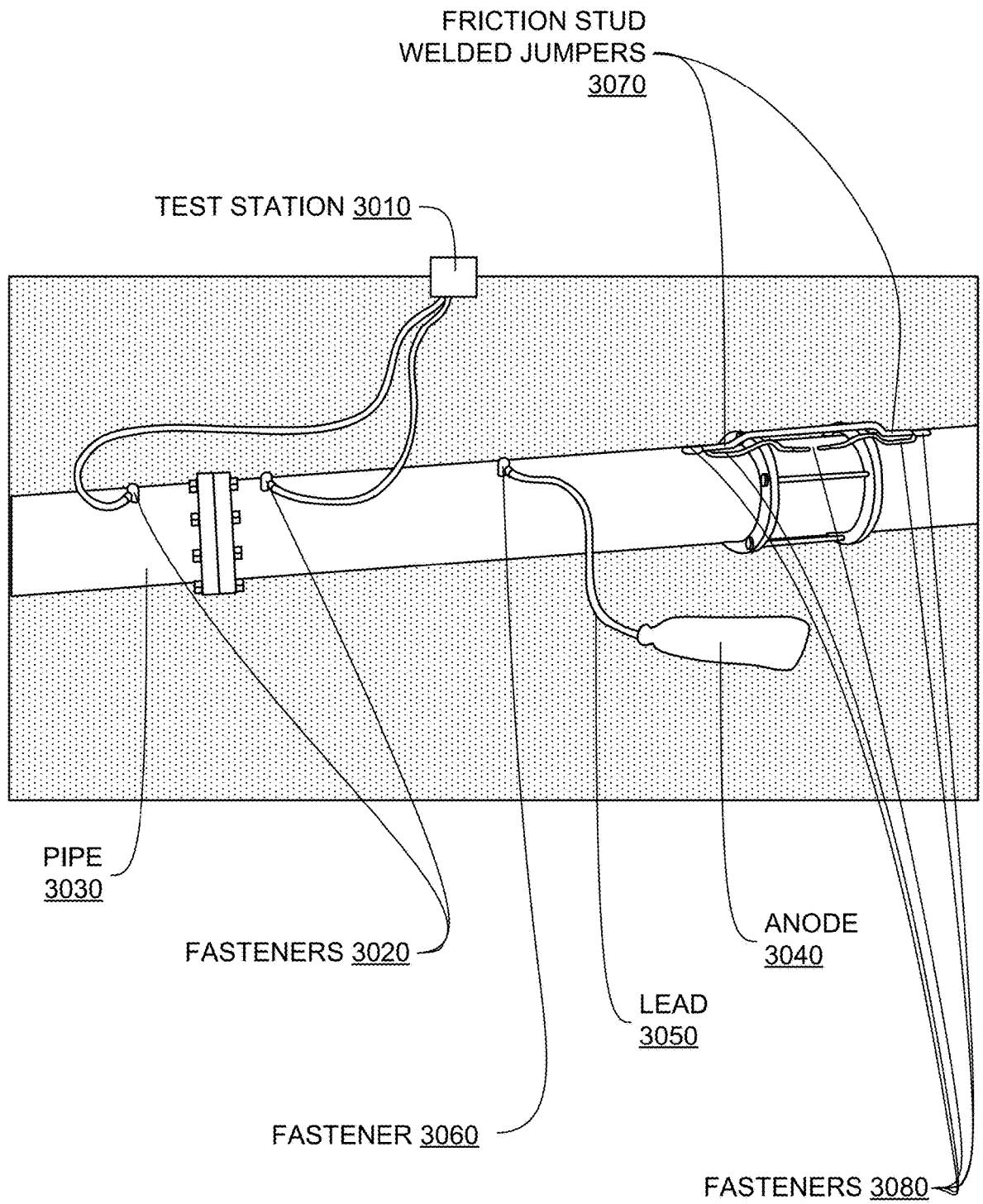
FIG. 30 is an isometric view of a friction stud welded cathodic protection system, according to an implementation.

FIG. 30 is an isometric view of a friction stud welded cathodic protection system 3000, according to an implementation. The friction stud welded cathodic protection system 3000 includes a test station 3010 that is operably coupled to leads that are operably coupled to fasteners 3020 that are operably coupled to a pipe 3030. The friction stud welded cathodic protection system 3000 includes an anode 3040 that is operably coupled to a lead 3050, that is operably coupled to a fastener 3060 that is operably coupled to the pipe 3030. The friction stud welded cathodic protection system 3000 includes friction stud welded jumpers 3070 and fasteners 3080. In combination with each other, each component performs its role in protecting the pipe 3030 from corrosion.

Figure 31:
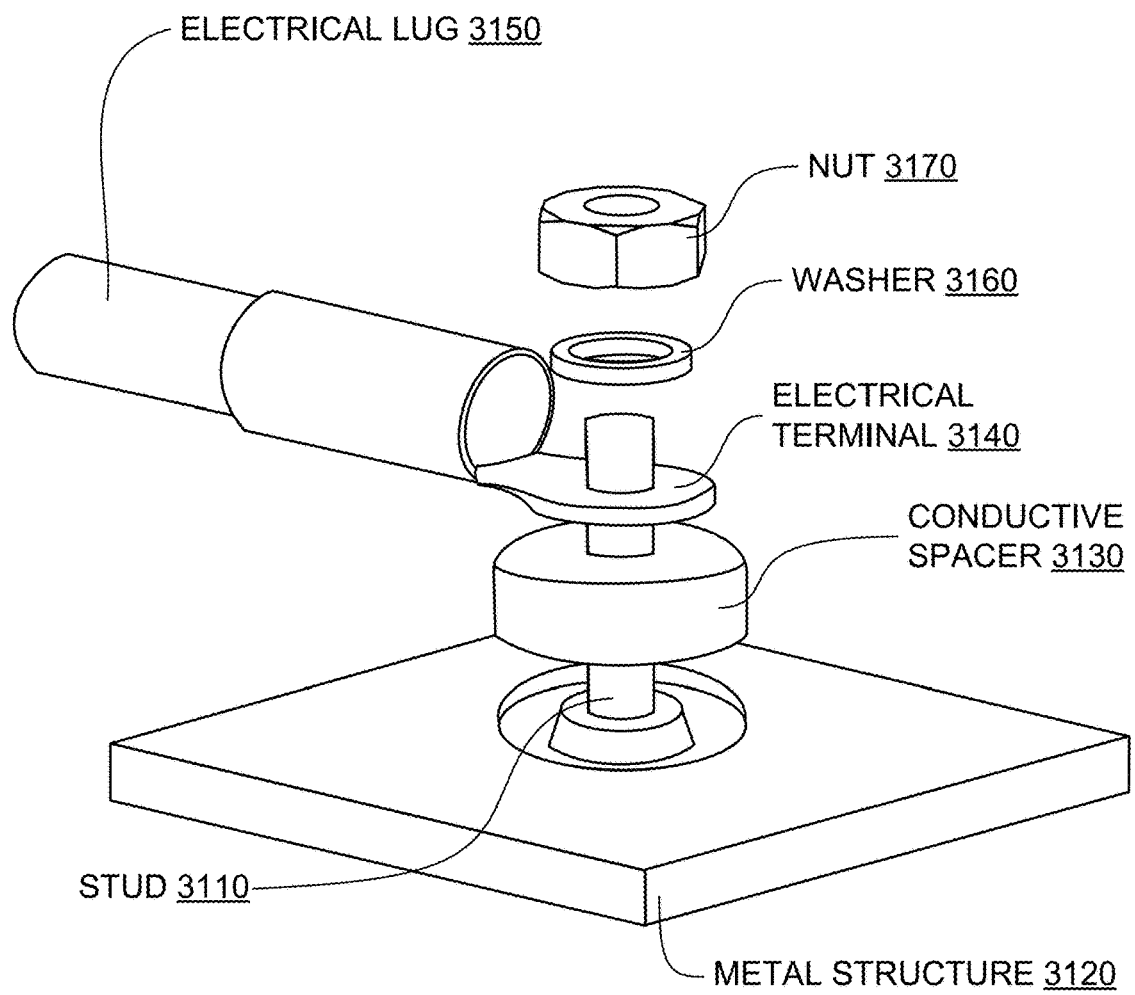
FIG. 31 is an isometric view of a friction stud welded electrical attachment, according to an implementation.

FIG. 31 is an isometric view of a friction stud welded electrical attachment 3100, according to an implementation. The friction stud welded electrical attachment 3100 includes a friction welded stud 3110 that is friction welded onto a metal structure 3120 such as a storage tank 120 or pipe 3030. A conductive spacer 3130 circumscribes the friction welded stud 3110. On the side of the conductive spacer 3130 that is opposite of the metal structure 3120, an electrical terminal 3140 of an electrical lug 3150 circumscribes the friction welded stud 3110. On the side of the electrical terminal 3140 that is opposite of the conductive spacer 3130, a washer 3160 circumscribes the friction welded stud 3110. On the side of the washer 3160 that is opposite of the electrical terminal 3140, a nut 3170 circumscribes the friction welded stud 3110. When assembled, each of the components creates friction stud welded electrical attachment 3100.

Figure 32:
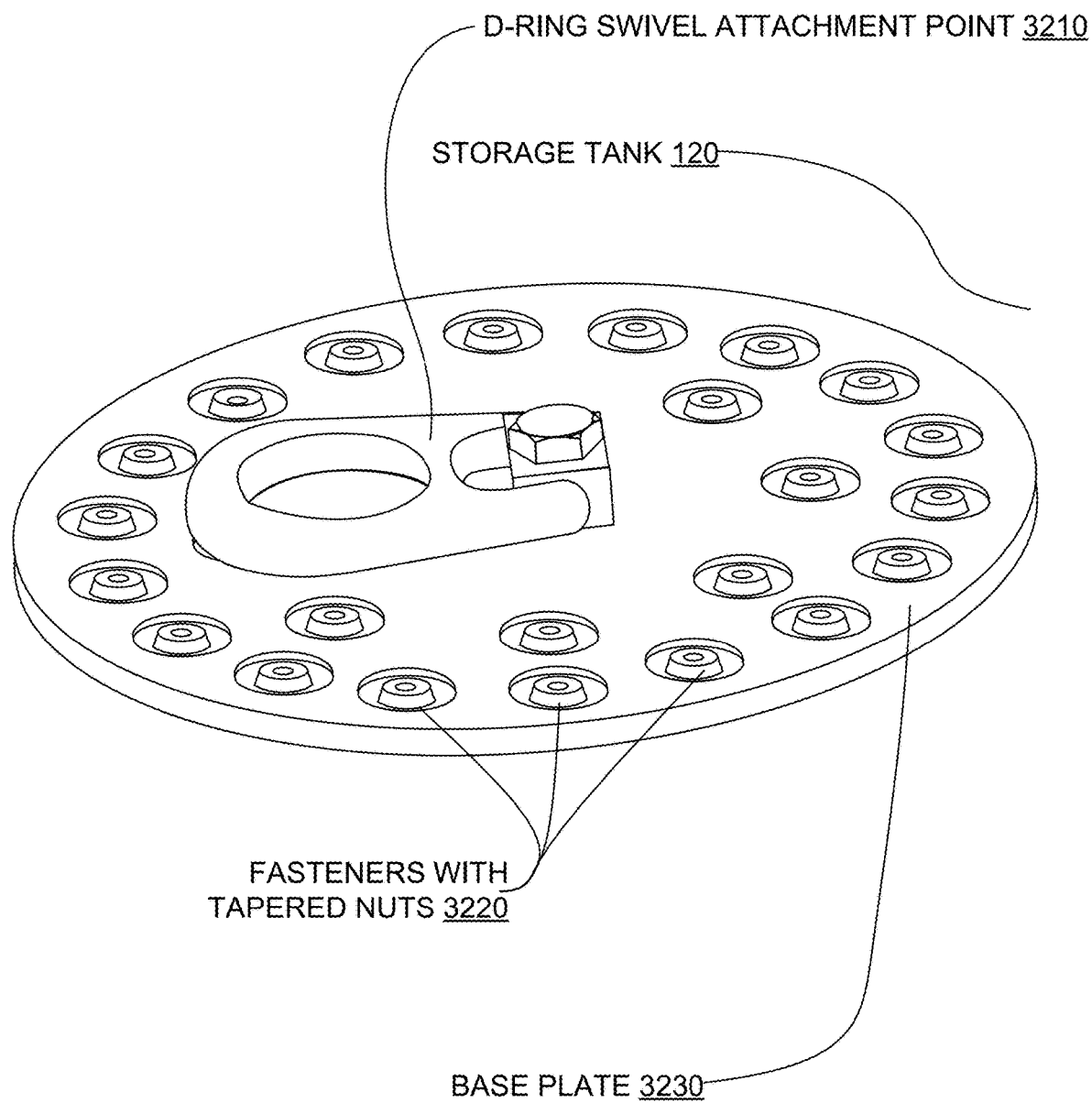
FIG. 32 is an isometric view of a friction stud welded scaffold cable support, according to an implementation.

FIG. 32 is an isometric view of a friction stud welded scaffold cable support 3200, according to an implementation. The friction stud welded scaffold cable support 3200 includes a D-ring swivel attachment point 3210, fasteners with tapered nuts 3220, base plate 3230 and storage tank 120. Different types of nuts can be used, however, the tapered nuts minimize the chance that the cable, tied to the D-ring swivel attachment point 3210, will hang up on the fasteners with tapered nuts 3220. The size and strength of the D-ring swivel attachment point 3210, the number of fasteners with tapered nuts 3220 and the dimensions of the base plate 3230 can be adjusted to meet the load requirements. A sealant may be applied between the base plate 3330 and storage tank 120 or alternate surface.

Figure 33:
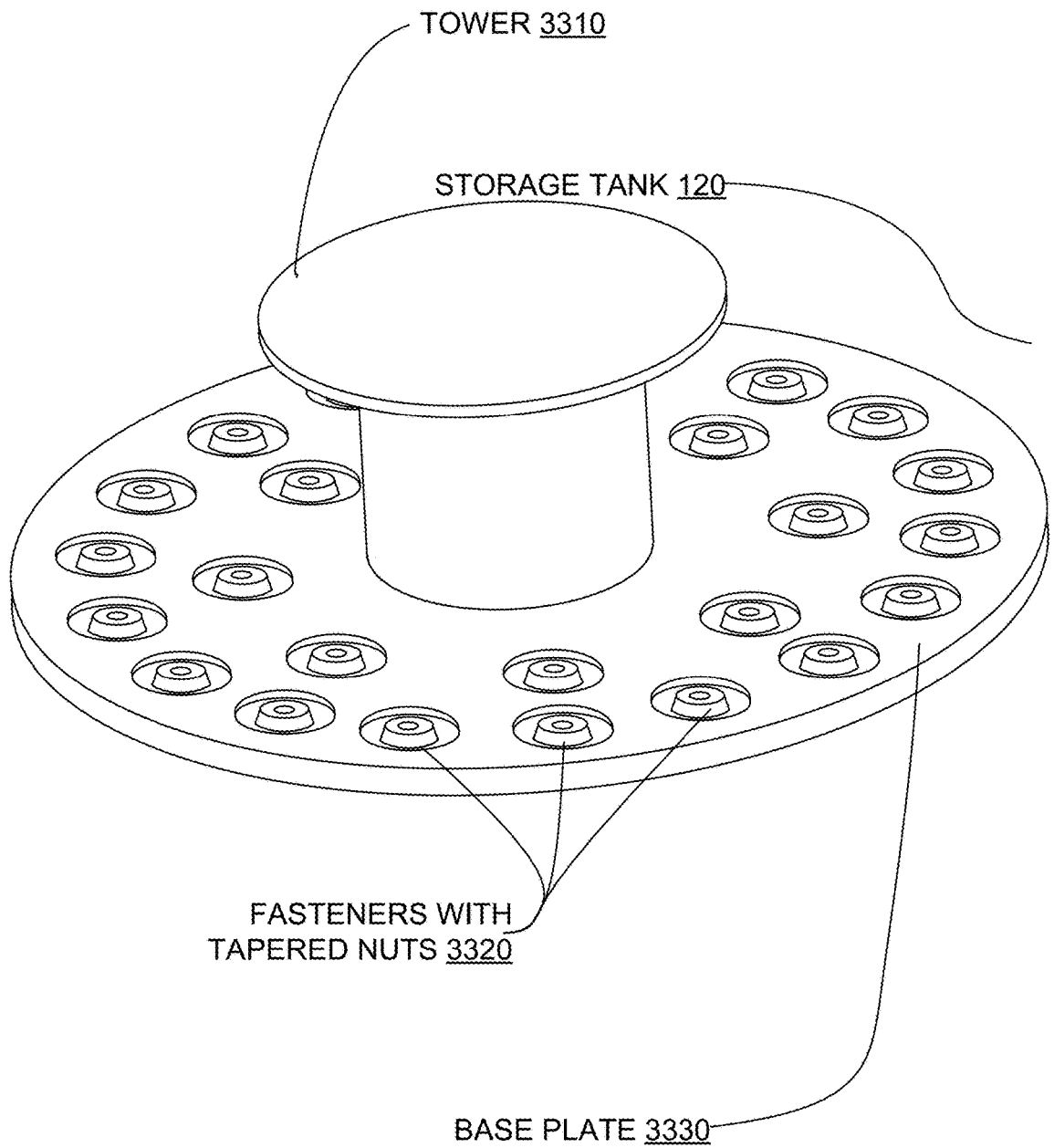
FIG. 33 is an isometric view of a friction stud welded scaffold cable support, according to an implementation.

FIG. 33 is an isometric view of a friction stud welded scaffold cable support 3300, according to an implementation. The friction stud welded scaffold cable support 3300 includes a tower 3310, fasteners with tapered nuts 3320 and base plate 3330 all attached to storage tank 120 or alternate surface. The dimensions of the tower 3310, the number of fasteners with tapered nuts 3320 and the dimensions of base plate 3330 can be adjusted to meet the load requirements. A sealant would be applied between the base plate 3330 and storage tank 120 or alternate surface.

Figure 34:
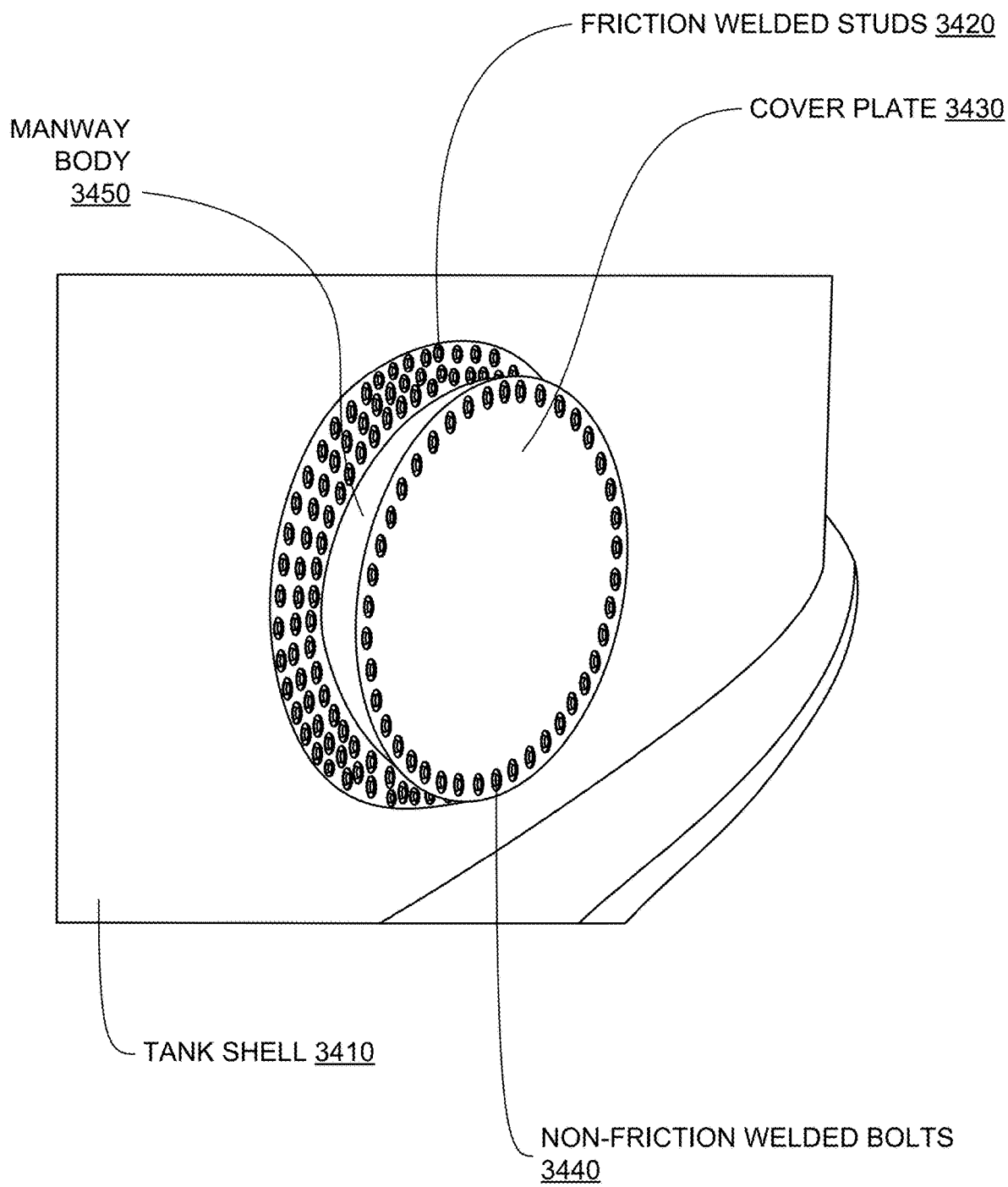
FIG. 34 is an isometric view of a friction stud welded manway installation, according to an implementation.

FIG. 34 is an isometric view of a friction stud welded manway installation 3400, according to an implementation. The friction stud welded manway installation 3400 includes a tank shell 3410 to which are attached friction welded studs 3420, manway body 3450 and a cover plate 3430 which is attached to manway body 3450 with non-friction welded bolts 3440. Friction stud welded manway installation 3400 may be designed to support the hoop stress of tank shell 3410. A sealing material (not shown) would provide a seal against tank shell 3410 or alternate surface.

Figure 35:
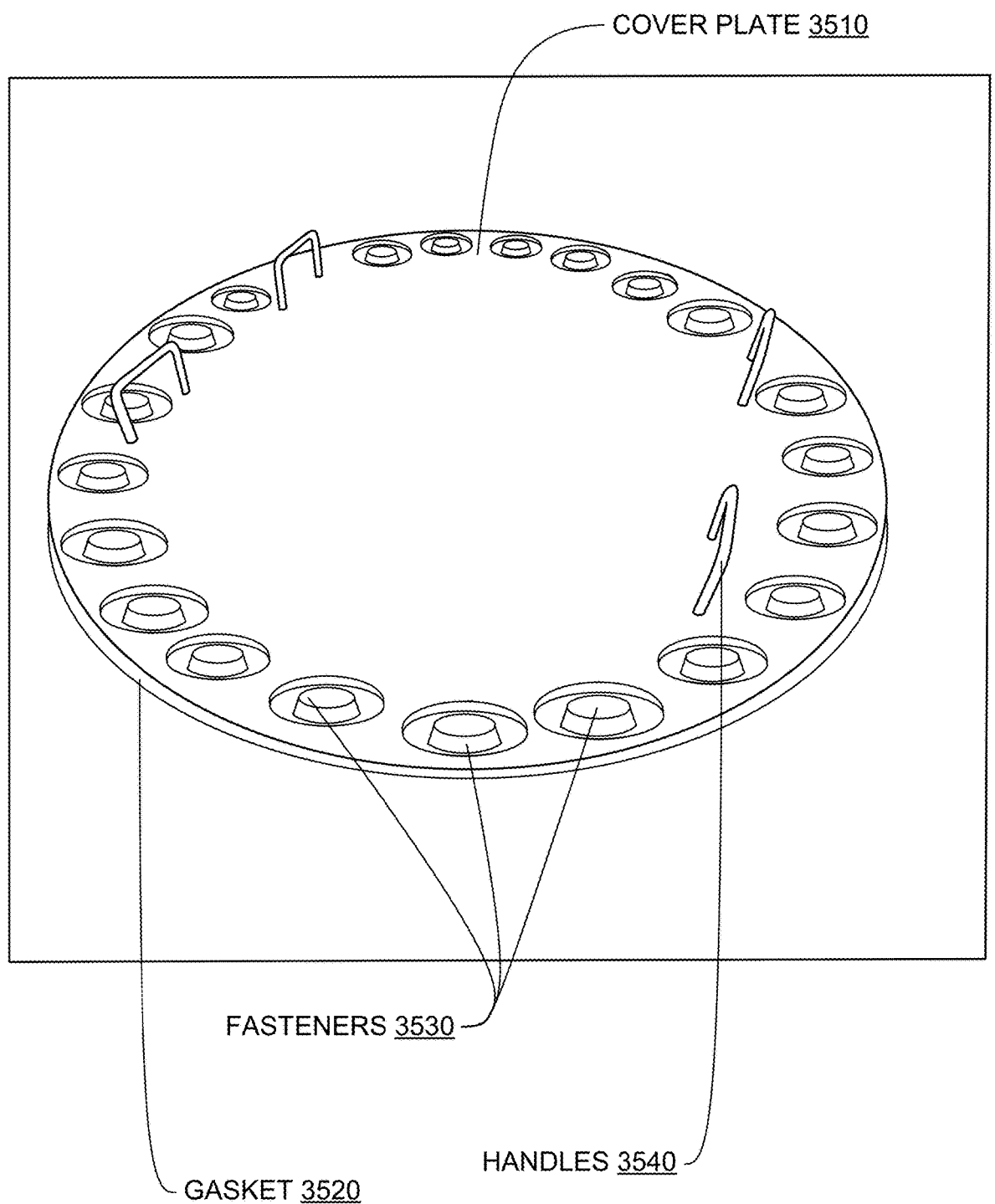
FIG. 35 is an isometric view of a friction stud welded cover plate, according to an implementation.

FIG. 35 is an isometric view of a friction stud welded cover plate 3500, according to an implementation. The friction stud welded cover plate 3500 can be used to cover a hole, in a fixed tank roof or other storage container, that is used to access the tank for cleaning or other purposes. The friction stud welded cover plate 3500 includes a cover plate 3510 with handles 3540 and a gasket 3520 to seal against the roof to which are attached friction stud welded fasteners 3530 that compress cover plate 3510 and gasket 3520 to seal against the roof. Cover plate 3510 can be unbolted and removed each time the tank needs to be accessed.

Figure 36:
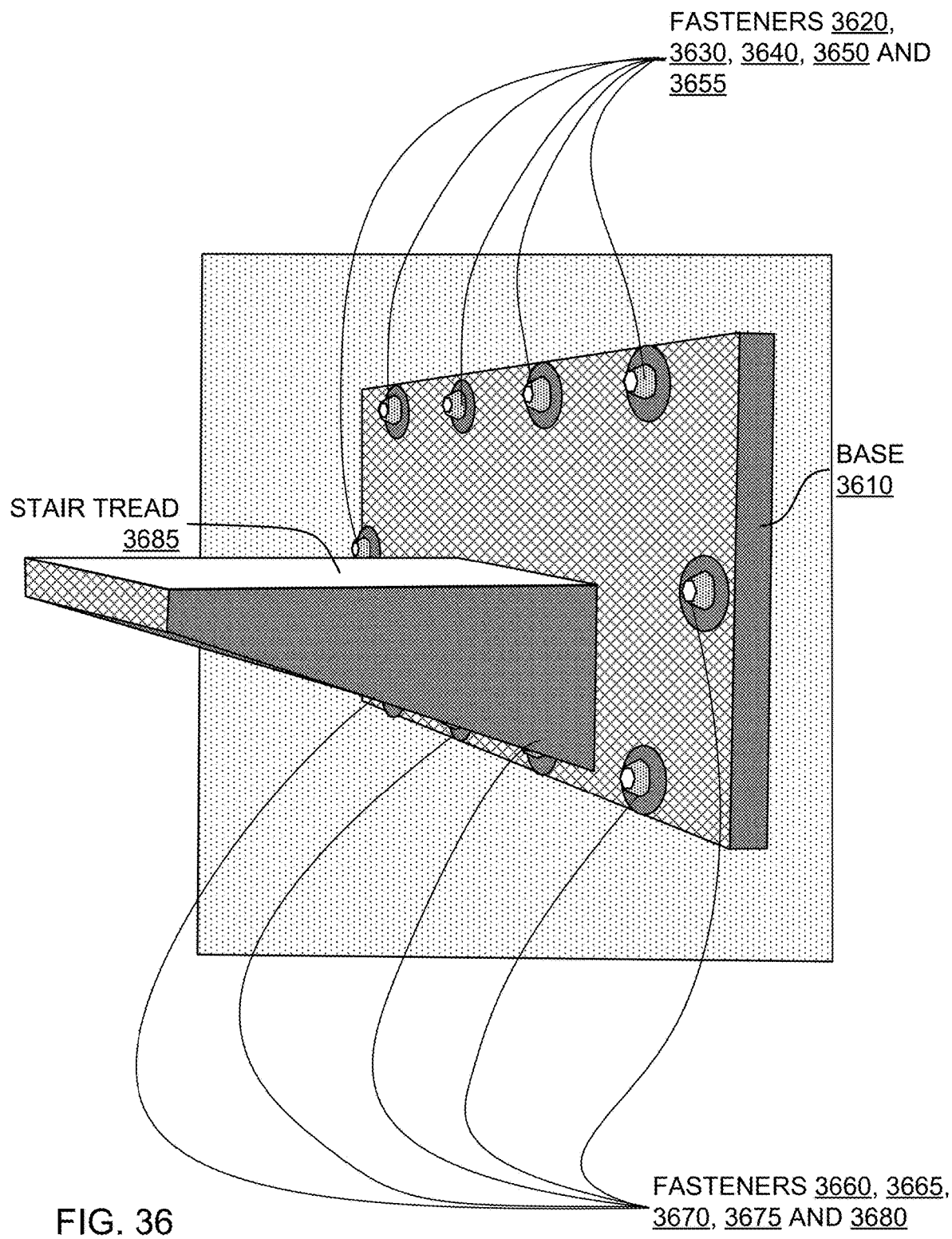
FIG. 36 is an isometric view of a friction stud welded stair installation apparatus, according to an implementation.

FIG. 36 is an isometric view of a friction stud welded stair installation apparatus 3600, according to an implementation. The friction stud welded stair installation apparatus 3600 includes a base 3610, at least one fastener, such as fasteners 3620, 3630, 3640, 3650, 3655, 3660, 3665, 3670, 3675 and 3680. The friction stud welded stair installation apparatus 3600 also includes a full stair tread 3685 that is welded, bolted, riveted or integrally formed with the base 3610. The full stair tread 3685 may have additional supports on the left side in FIG. 36. The friction stud welded stair installation apparatus 3600 is useful for installing a full stair tread to the vertical or sloped surface of a tank such as the roof or shell of storage tank 120 to be used as one of many stair treads to create a stairway.

Figure 37:
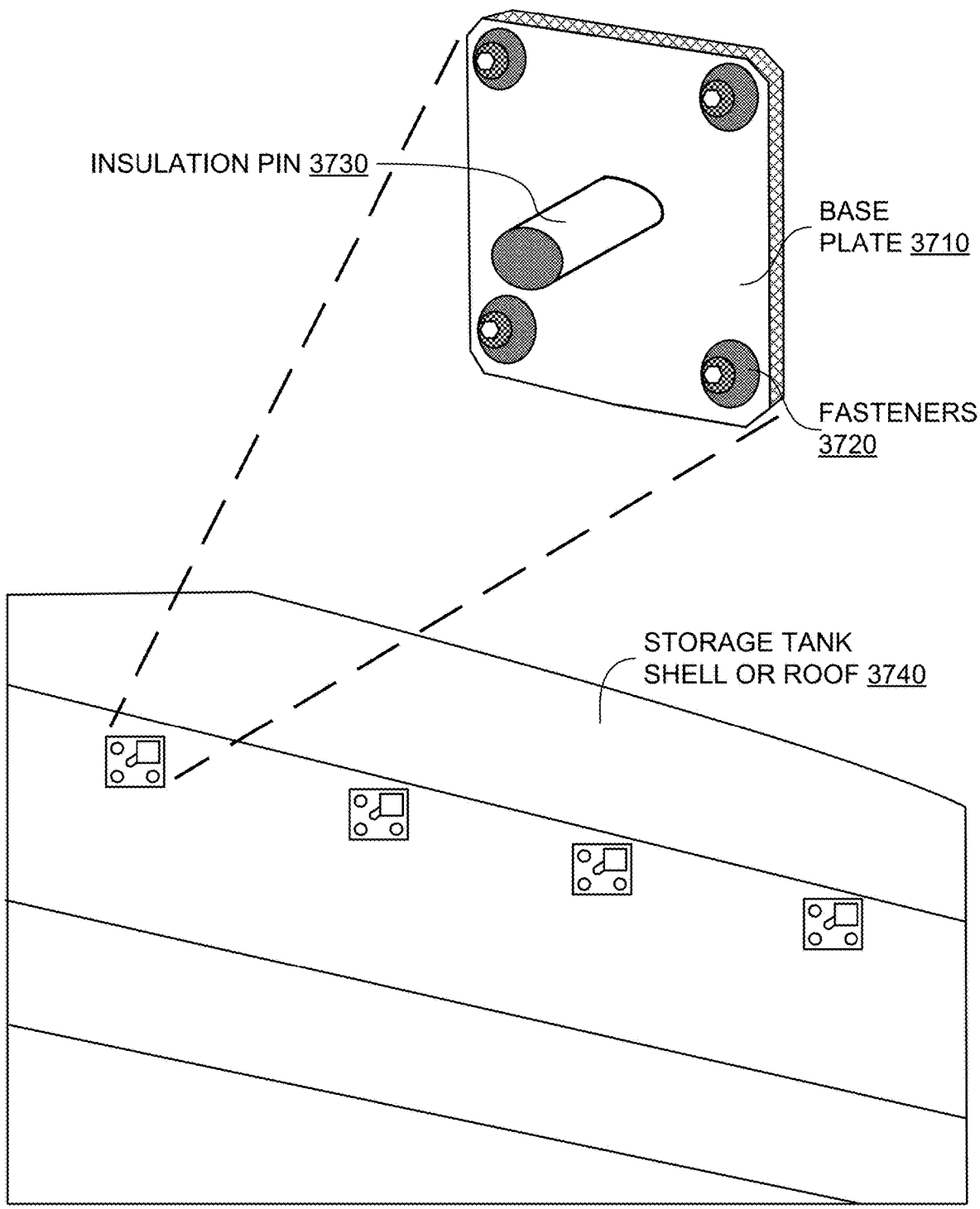
FIG. 37 is an isometric view of a friction stud welded insulation hanger, according to an implementation.

FIG. 37 is an isometric view of a friction stud welded insulation hanger 3700, according to an implementation. The friction stud welded insulation hangers 3700 includes an insulation pin 3730 and a base plate 3710 which is attached to storage tank shell or roof 3740 via fasteners 3720. A plurality of friction stud welded insulation hangers 3700 can be attached to a storage tank shell or roof 3740 or other surface for hanging insulation.

Figure 38:
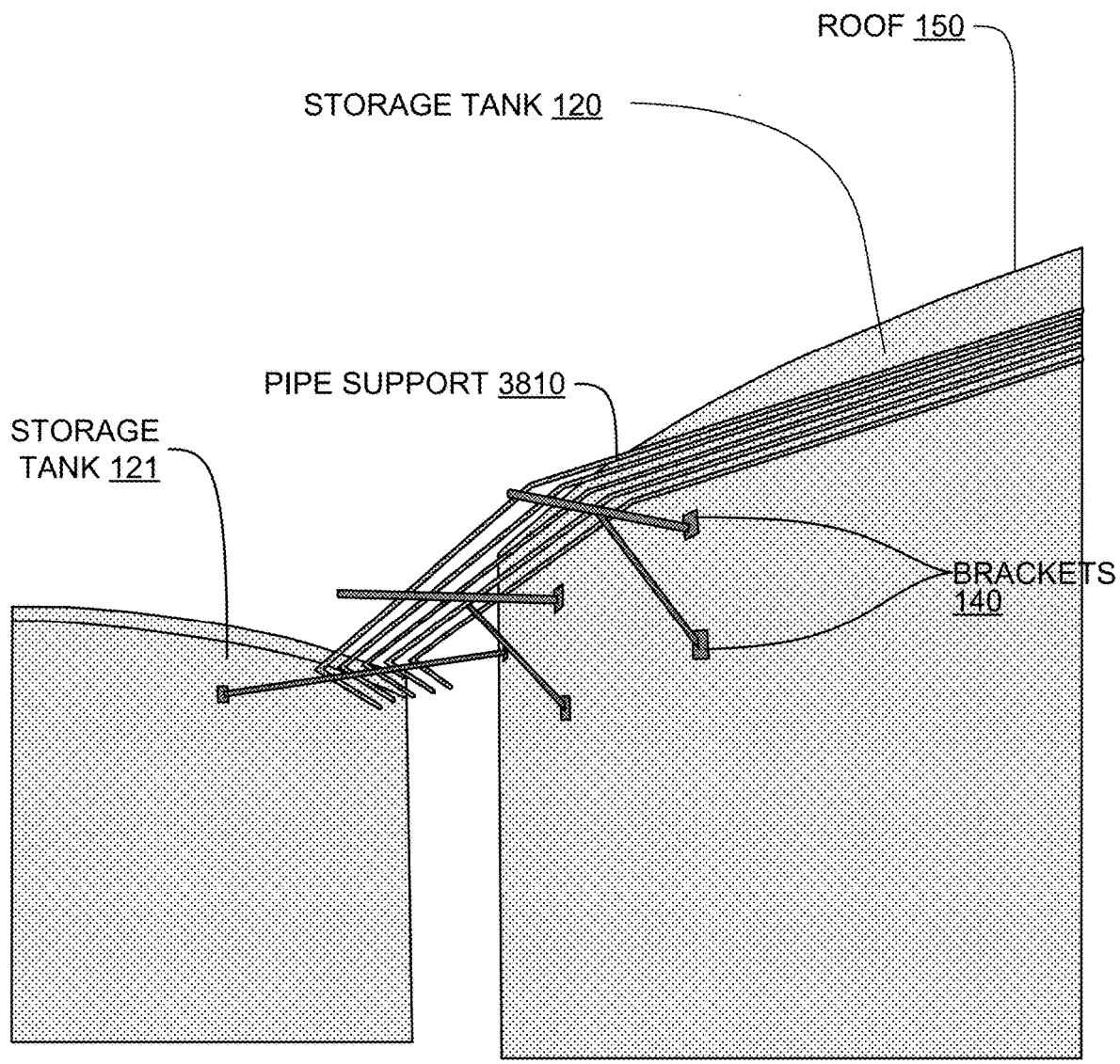
FIG. 38 is an isometric view of a friction stud welded pipe support apparatus, according to an implementation.

FIG. 38 is an isometric view of a friction stud welded pipe support apparatus 3800, according to an implementation. The friction stud welded pipe support apparatus 3800 includes a pipe support 3810 that is attached to storage tank 120 and a storage tank 121 via friction stud welding. The pipe support 3810 is attached to the storage tank 120 (and may be to storage tank 121) via a friction stud welded bracket 140 that is attached to storage tank 120 via friction stud welded fasteners (not shown). Pipe support 3810 may be bolted, riveted or welded to friction stud welded bracket 140, or it may be integral with friction stud welded bracket 140. Examples of the friction stud welded bracket 140 that are operable in the friction stud welded wind girder apparatus 100 are the friction stud welded brackets in FIG. 12-13.

Figure 39:
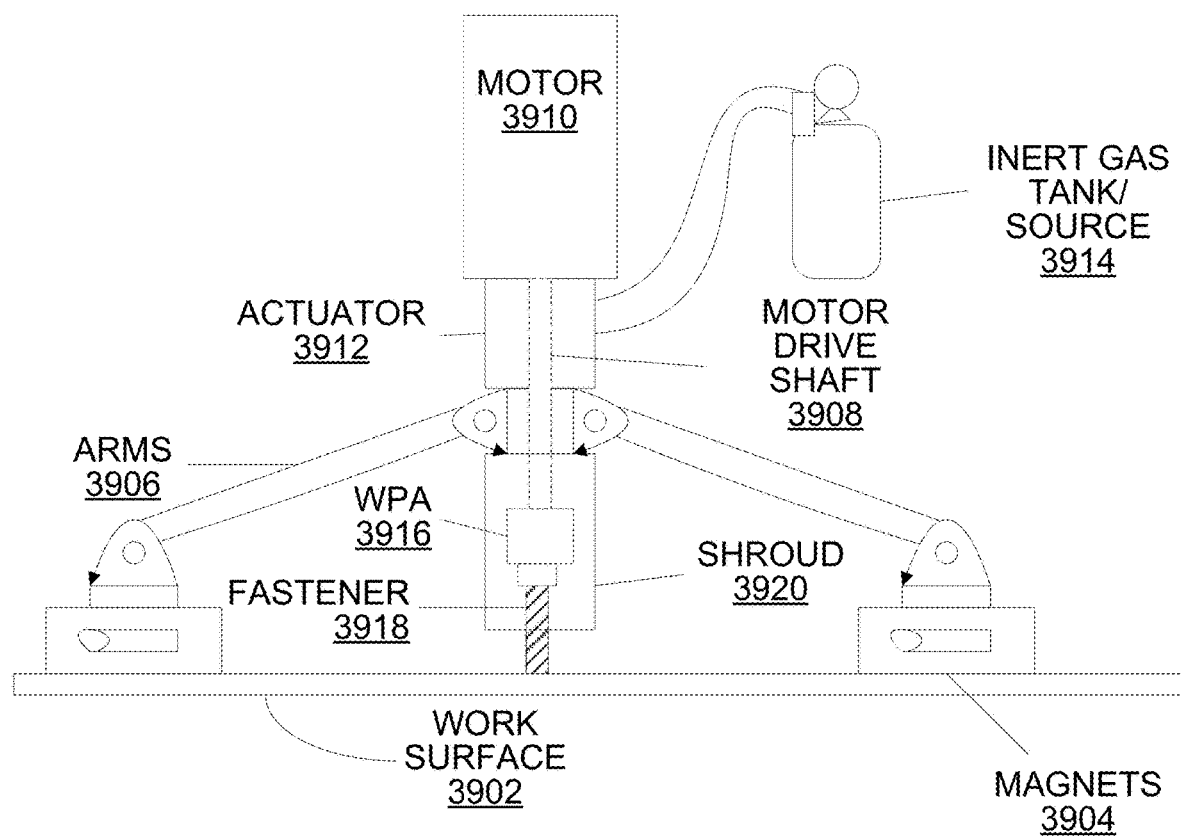
FIG. 39 is a side-view of a block diagram of a friction welding apparatus that uses inert gas.

FIG. 39 is a side-view of a block diagram of a friction welding apparatus 3900 that uses inert gas, according to an implementation. The friction welding apparatus 3900 generates less heat to the extent that combustible materials are not combusted. Examples of the inert gas are nitrogen, argon and helium. The friction welding apparatus 3900 is positioned over a work surface 3902 such as storage tank roof 150 in FIG. 1. The friction welding apparatus 3900 also includes a motor drive shaft 3908 that is mechanically coupled to a pneumatic motor 3910. In some implementations, the pneumatic motor 3910 is a pneumatic vane motor, or another motor that is made of materials that do not create sparks or an ignition source. Friction welding apparatus 3900 also includes an actuator 3912 that is removably coupled to an inert gas tank 3914. The motor drive shaft 3908 is mechanically coupled to a WPA 3916, and the WPA is operably coupled to a fastener 3918. A shroud 3920 encompasses a portion of the fastener 3918, the WPA 3916 and a lower portion of the motor drive shaft 3908. When the inert gas from the inert gas tank 3914 is released into the actuator 3912, the inert gas flows through the actuator 3912 and down to and through the shroud 3920 and then out the bottom of the shroud 3920, the worksite where the fastener 3918 meets the work surface 3902 and envelopes the worksite in a non-combustible inert gas thus preventing combustion in the vicinity of the tank.

The pneumatic motor 3910, the actuator 3912, and the shroud 3920 operate using positive pressure from the inert gas tank 3914. The magnets 3904 which form a clamp with arms 3906 secure the friction welding apparatus 3900 to the work surface.

Figure 40:
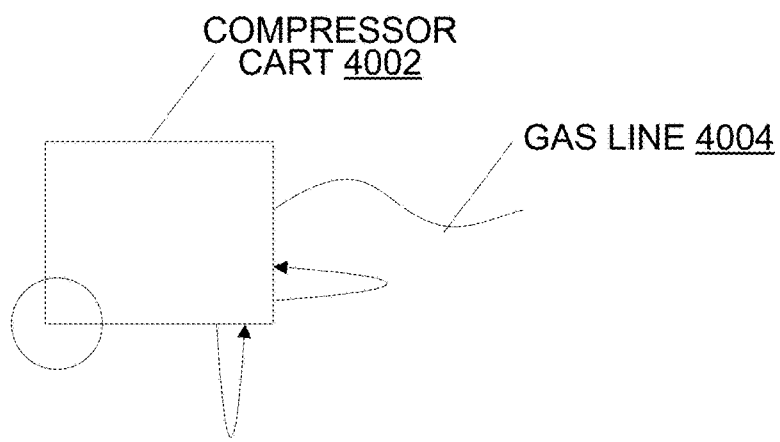
FIG. 40 is a pneumatic motor propulsion source.

FIG. 40 is a pneumatic motor propulsion source 4000, according to an implementation. The pneumatic motor propulsion source 4000 is one example of a compressed gas tank. The pneumatic motor propulsion source 4000 includes a compressor cart 4002 that has an air compressor built-in a gas line 4004 couples the air compressor to a pneumatic motor, such as pneumatic motor 3910 in FIG. 39. As an alternative, a tank of compressed gas can be implemented instead of, or in addition to, the air compressor.

Figure 41:
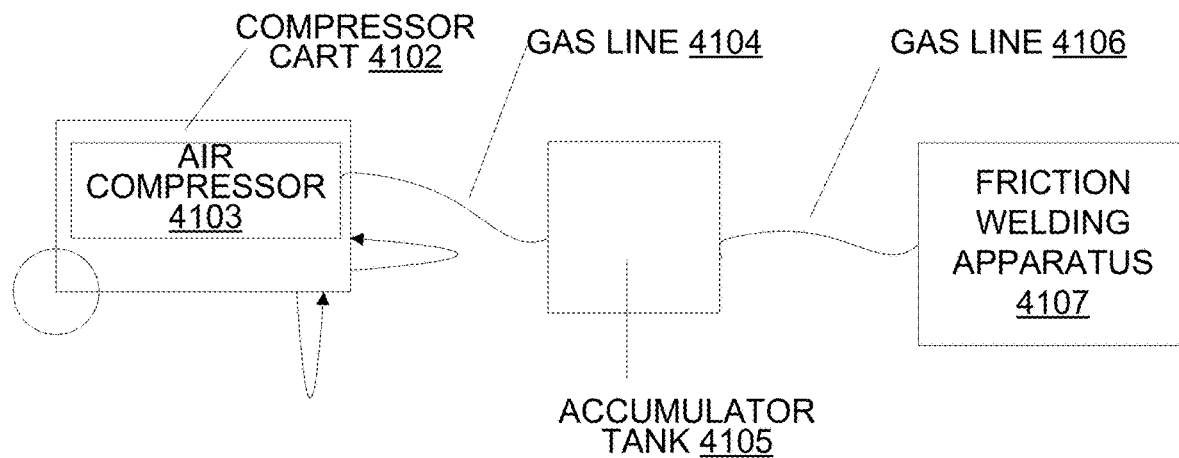
FIG. 41 is a pneumatic motor propulsion source.

FIG. 41 is a pneumatic motor propulsion source 4100. The pneumatic motor propulsion source 4100 includes a compressor cart 4102 that has an air compressor 4103. A gas line 4104 couples the air compressor 4101 to an accumulator tank 4105 that is operably coupled to a second gas line 4106 that can be operably coupled to a pneumatic motor or a friction welding apparatus 4107. Examples of the friction welding apparatus 4107 include the friction welding apparatus in FIG. 39.

Figure 42:
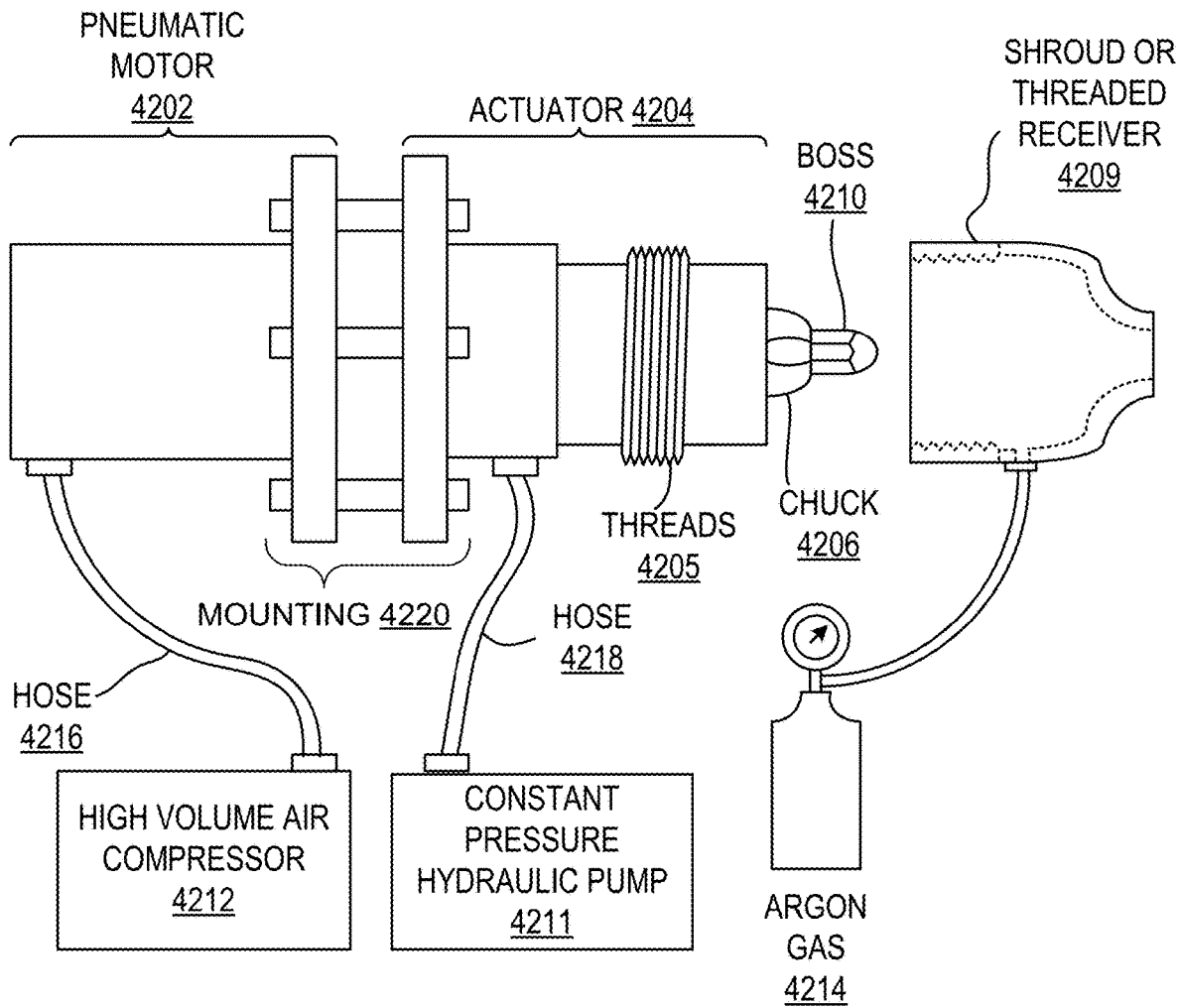
FIG. 42 is a block diagram of a portable friction forge bonder, according to an implementation.

FIG. 42 is a block diagram of a portable friction forge bonder (PFFB) 4200, according to an implementation. The portable friction forge bonder (PFFB) 4200 includes a pneumatic motor 4202, an actuator 4204 and a chuck 4206. A shroud or threaded receiver 4209 allows the PFFB to be connected to the device being enhanced or repaired. The chuck 4206 holds and couples the rotational driving force from the pneumatic motor 4202 and the axial load force from the actuator 4204, to a boss 4210. The actuator 4204 that has threads 4205 applies a predetermined amount of load to the chuck 4206 and the boss 4210 through pressure from a constant pressure hydraulic pump 4211. The pneumatic motor 4202 derives its power from a high volume air compressor 4212. The shroud or threaded receiver 4209 bathes the boss 4210 in an inert gas such as argon gas 4214 to eliminate air and thus any possibility of ignition from the welding area and to improve the quality of the weld. The constant pressure hydraulic pump 4211 is operably coupled to the actuator 4204 through a hose 4218. The high volume air compressor 4212 is operably coupled to the pneumatic motor 4202 through a hose 4216. The high volume air compressor 4212 can be connected to the constant pressure hydraulic pump 4211 to provide power for the constant pressure hydraulic pump 4211. A hand pump (not shown) could also be used to power the constant pressure hydraulic pump 4211.

Figure 43:
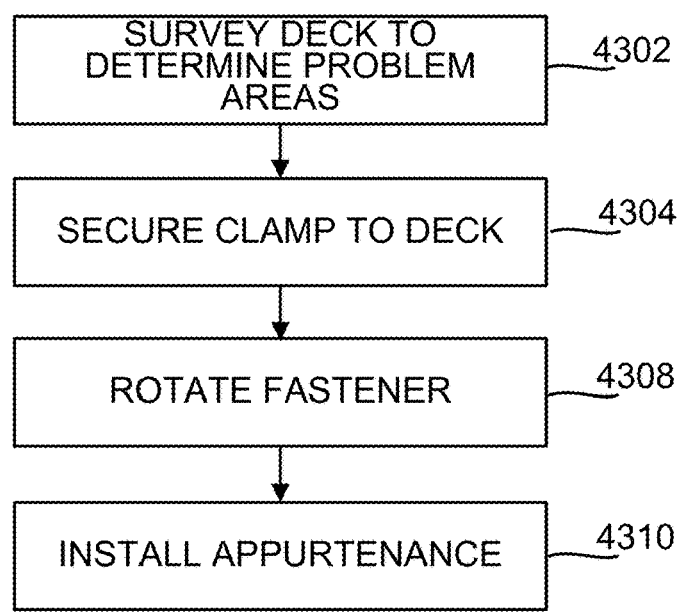
FIG. 43 is a flowchart of a method of a process of tank repair.

FIG. 43 is a method 4300 of a process of tank repair, according to an implementation. At block 4302, method 4300 includes surveying a deck of a tank such as the storage tank roof 150 in FIG. 1 to identify installation locations on the deck. Thereafter at block 4304 method 4300 further includes securing a clamp to the deck in proximity to the installation location to begin repair work on the surface of the deck in the area of the installation location. The securing or clamping of block 4304 can be performed by vacuum, using magnets, using dead weight or by mechanical bolting. In some implementations, method 4300 includes using the clamp to apply an axial load to a fastener. Thereafter at block 4308, method 4300 includes rotating the fastener, and at block 4310 applying an appurtenance to the installation location on the deck. Alternatives to the fastener include a threaded boss, or nut, fittings, pins, nozzles, nodes, zerts and nails.

In some implementations of rotating the fastener at block 4308, rotating the fastener further includes rotating the fastener until a weld reaches a predetermined temperature, number of rotations, fastener link reduction (displacement), time or combination. In some implementations of method 4300, method 4300 includes deburring the fastener after rotating the fastener at block 4308. In some implementations of applying the appurtenance at block 4310, compression, injection or a gravity fill seal is used to apply the appurtenance.

Figure 44:
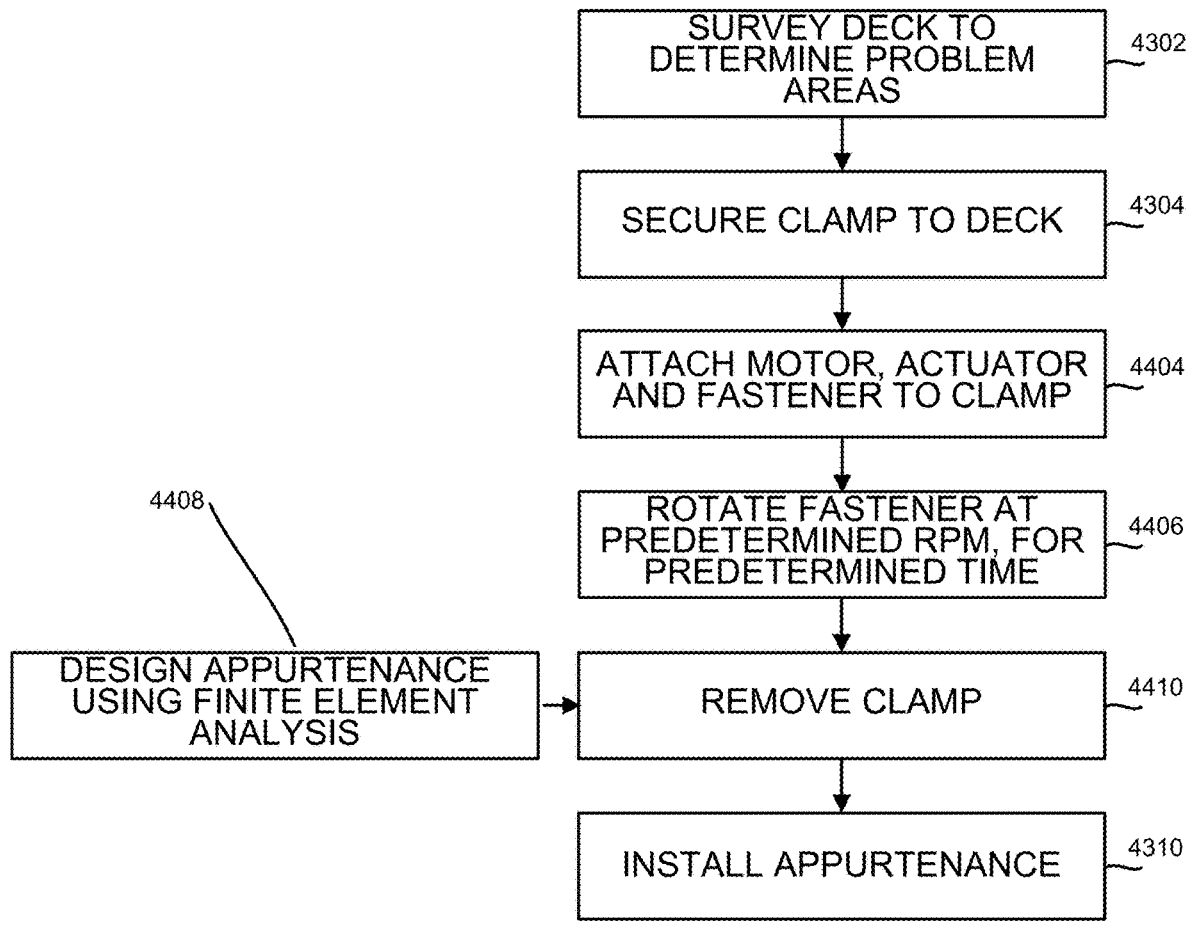
FIG. 44 is a flowchart of a method of a tank repair process.

FIG. 44 is a flowchart of a method 4400 of a tank repair process, according to an implementation. At block 4302, method 4400 includes surveying a deck of a tank such as the storage tank roof 150 in FIG. 1 to identify installation locations on the deck. Thereafter at block 4304 method 4300 further includes securing a clamp to the deck in proximity to the installation location to begin repair work on the surface of the deck in the area of the installation location. Thereafter at block 4404, method 4400 includes attaching a motor, an actuator and a fastener to the clamp. In some implementations, humans perform the function of the clamp. Some implementations include using the clamp to apply an axial load to a fastener. Thereafter at block 4406, method 4400 includes rotating the fastener under a predetermined pressure and speed for a predetermined time. At block 4408, method 4400 also includes designing a appurtenance using finite element analysis. Thereafter, at block 4410, method 4400 includes removing the clamp, and at block 4310, method 4400 includes installing the appurtenance with the fastener.

CONCLUSION

The techniques and apparatus of the drawings and detailed description can be implemented in the energy industry in petrochemical, oil and gas, nuclear, coal and gas power plants, solar and wind, hydro-electric and transportation of energy products by rail, truck, ships, pipeline and air; the drawings and detailed description can be implemented in the construction of buildings, bridges and towers; the drawings and detailed description can be implemented in marine construction of ships, commercial and military, submarines, tankers and barges at ship yards, docks, offshore and semisubmersibles; and the drawings and detailed description can be implemented in mining, underground, agriculture, grain storage and aviation and space.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single implementation for the purpose of streamlining the disclosure. This disclosure is not to be interpreted as reflecting an intention that the claimed implementations require more features than are expressly recited in each claim. Rather, as the following claims reflect, inventive subject matter may be directed to less than all of the features of any of the disclosed implementations. Thus, the following claims are incorporated into the Detailed Description of the Drawings, with each claim standing on its own as defining separately claimed subject matter.

The numerous innovative teachings of the present application will be described with particular reference to the exemplary implementations. However, it should be understood that this class of implementations provides only a few examples of the many advantageous uses of the innovative teachings herein. In general, statements made in the specification of the present application do not necessarily limit any of the various claimed inventions. To the contrary, the description of the exemplary implementations are intended to cover alternative, modifications, and equivalents as may be included within the spirit and scope of the invention as defined by the claims. Moreover, some statements may apply to some inventive features but not to others.

The above disclosed subject matter is to be considered illustrative, and not restrictive, and the appended claims are intended to cover all such modifications, enhancements, and other implementations which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

The invention claimed is:

1. An apparatus within a vicinity of a hazardous material comprising:
    studs attached to a tank by a friction forge weld, the tank having a wall, the wall having two parallel surfaces, the studs penetrating within the vicinity of the hazardous material only one of the parallel surfaces; and
    a bracket that is secured to the tank using the studs and a nut threaded onto each of the studs,
        wherein the bracket includes a base and a flange that is fixedly attached to the base, the base having at least one fastener hole, the flange including at least one support hole,
        wherein the base has a rectangular planar shape,
        wherein the flange has a rectangular planar shape.

2. The apparatus of claim 1, wherein the base and the flange are welded together.

3. The apparatus of claim 1, wherein the base and the flange are integral.

4. The apparatus of claim 1, wherein the base has a square planar shape in which a height of the base is less than a length of the base and the height of the base is less than a width of the base and wherein the flange is fixedly attached to the base along the length of the base.

5. The apparatus of claim 4, wherein the flange is fixedly attached to the base along the width of the base.

6. The apparatus of claim 1, the base having four fastener holes, the flange including two support holes.

7. The apparatus of claim 1, wherein the base has a square planar shape in which a height of the base is less than a length of the base and the height of the base of less than a width of the base,
    wherein the corner of each side of the base between the length and the width of the base further comprises a diagonal corner.

8. The apparatus of claim 1, wherein a height of the flange is less than a width of the flange, and the height of the flange is less than a length of the flange,
    wherein the corner of two sides of the flange along the other length further comprises a diagonal corner.

9. An apparatus within a vicinity of a hazardous material comprising:
    a stud attached to a tank by a friction forge weld, the tank having a roof, the roof having two parallel surfaces, the stud penetrating the roof through only one of the parallel surfaces, within the vicinity of the hazardous material; and
    a bracket that is secured to the roof of the tank using the stud and a nut threaded onto the stud,
        wherein the bracket includes a base and a flange that is fixedly attached to the base, the base having at least one fastener hole, the flange including at least one support hole,
        wherein the base has a rectangular planar shape,
        wherein the flange has a rectangular planar shape.

10. The apparatus of claim 9, wherein the base and the flange are welded together.

11. The apparatus of claim 9, wherein the base and the flange are integral.

12. The apparatus of claim 9, wherein the flange is fixedly attached to the base along the length.

13. The apparatus of claim 12, wherein the flange is fixedly attached to the base along the width.

14. The apparatus of claim 9, the base having four fastener holes, the flange including two support holes.

15. The apparatus of claim 9, wherein the base has a square planar shape in which a height of the base is less than a length of the base and the height of the base of less than a width of the base,
    wherein the corner of each side of the base between the length and the width of the base further comprises a diagonal corner.

16. The apparatus of claim 9, wherein a height of the base of the flange is less than a width of the flange, and a width of the flange is less than a length of the flange,
    wherein the corner of two sides of the flange along the other length further comprises a diagonal corner.

17. An apparatus within a vicinity of a hazardous material comprising:
    a stud attached to a tank by a friction forge weld, the tank having a bottom, the bottom having two parallel surfaces, the stud penetrating the bottom through only one of the parallel surfaces, within the vicinity of the hazardous material; and
    a bracket that is secured to the bottom of the tank using the stud and a nut threaded onto the stud,
        wherein the bracket includes a base and a flange that is fixedly attached to the base, the base having at least one fastener hole, the flange including at least one support hole,
        wherein the base has a rectangular planar shape,
        wherein the flange has a rectangular planar shape.

18. The apparatus of claim 17, wherein the base and the flange are welded together.

19. The apparatus of claim 17, wherein the base and the flange are integral.

20. The apparatus of claim 17, wherein the flange is fixedly attached to the base along a length of the flange.

* * * * *